United States Patent
Shiomi

(10) Patent No.: US 6,282,376 B1
(45) Date of Patent: *Aug. 28, 2001

(54) IMAGE STABILIZING DEVICE

(75) Inventor: Yasuhiko Shiomi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/944,138

(22) Filed: Oct. 6, 1997

Related U.S. Application Data

(63) Continuation of application No. 08/159,934, filed on Nov. 30, 1993, now abandoned, which is a continuation of application No. 08/029,927, filed on Mar. 11, 1993, now abandoned, which is a continuation of application No. 07/700,763, filed on May 15, 1991, now abandoned.

(30) Foreign Application Priority Data

May 16, 1990 (JP) .................................................. 2-125878
May 16, 1990 (JP) .................................................. 2-127886

(51) Int. Cl.$^7$ ...................................................... G03B 17/00
(52) U.S. Cl. ............................................................ 396/55
(58) Field of Search ................................. 396/52, 53, 54, 396/55; 359/554, 557, 676, 678, 696, 705, 697, 698, 822, 823; 348/208

(56) References Cited

U.S. PATENT DOCUMENTS 4,965,619  * 10/1990  Shikaumi et al. ................... 354/410
5,107,293  *  4/1992  Sekine et al. ....................... 354/70 X

* cited by examiner

Primary Examiner—Alan A. Mathews
(74) Attorney, Agent, or Firm—Robin Blecker & Daley

(57) ABSTRACT

An image stabilizing device includes a vibration detector for detecting a vibrated state of an image, a vibration compensator responsive to the vibration detector to compensate for the vibrated state of the image, connection circuitry for substantially connecting the vibration detector to the vibration compensator and alleviating circuitry for preventing the vibration compensator from effecting sudden starting of an operation responding to the vibration detector during the connection by the connecting circuitry.

28 Claims, 22 Drawing Sheets

FIG. 9A

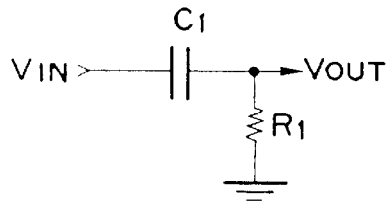

$$H(S) = \frac{V_{OUT}}{V_{IN}} = \frac{SC_1R_1}{1+SCR}$$

$$H(Z) = \frac{\frac{2}{T_1}}{\frac{1}{C_1R_1}+\frac{2}{T_1}} + \frac{-\frac{2}{T_1}}{\frac{1}{C_1R_1}+\frac{2}{T_1}} Z^{-1}}{1 + \frac{\frac{1}{C_1R_1}-\frac{2}{T_1}}{\frac{1}{C_1R_1}+\frac{2}{T_1}} Z^{-1}}$$

($T_1$ : SAMPLING TIME)

FIG. 9B

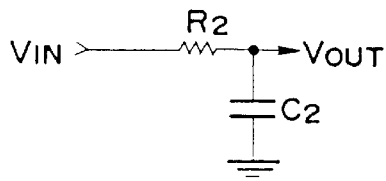

$$H(S) = \frac{V_{OUT}}{V_{IN}} = \frac{1}{1+SC_2R_2}$$

$$H(Z) = \frac{\frac{\frac{1}{C_2R_2}}{\frac{1}{C_2R_2}+\frac{2}{T_1}} + \frac{\frac{1}{C_2R_2}}{\frac{1}{C_2R_2}+\frac{2}{T_1}} Z^{-1}}{1 + \frac{\frac{1}{C_2R_2}-\frac{2}{T_1}}{\frac{1}{C_2R_2}+\frac{2}{T_1}} Z^{-1}}$$

($T_1$ : SAMPLING TIME)

FIG. 9C

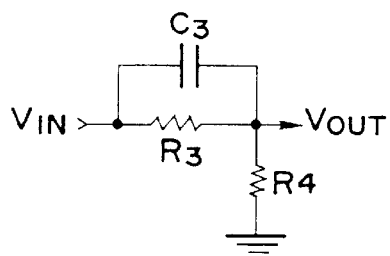

$$H(S) = \frac{V_{OUT}}{V_{IN}} = \frac{R_4+SC_3R_3R_4}{R_3+R_4+SC_3R_3R_4}$$

$$H(Z) = \frac{\frac{\frac{2}{T_2}+\frac{1}{C_3R_3}}{\frac{R_3+R_4}{C_3R_3R_4}+\frac{2}{T_2}} + \frac{\frac{1}{C_3R_3}-\frac{2}{T_2}}{\frac{R_3+R_4}{C_3R_3R_4}+\frac{2}{T_2}} Z^{-1}}{1 + \frac{\frac{R_1+R_4}{C_3R_3R_4}-\frac{2}{T_2}}{\frac{R_3+R_4}{C_3R_3R_4}+\frac{2}{T_2}} Z^{-1}}$$

($T_2$ : SAMPLING TIME)

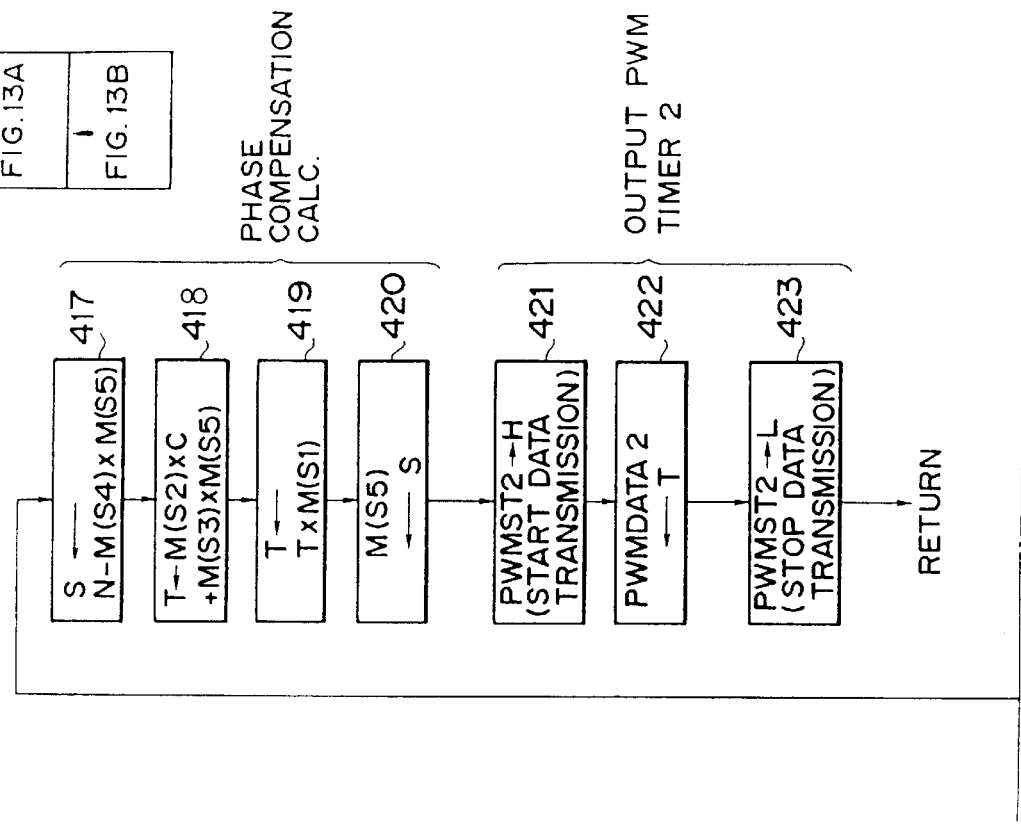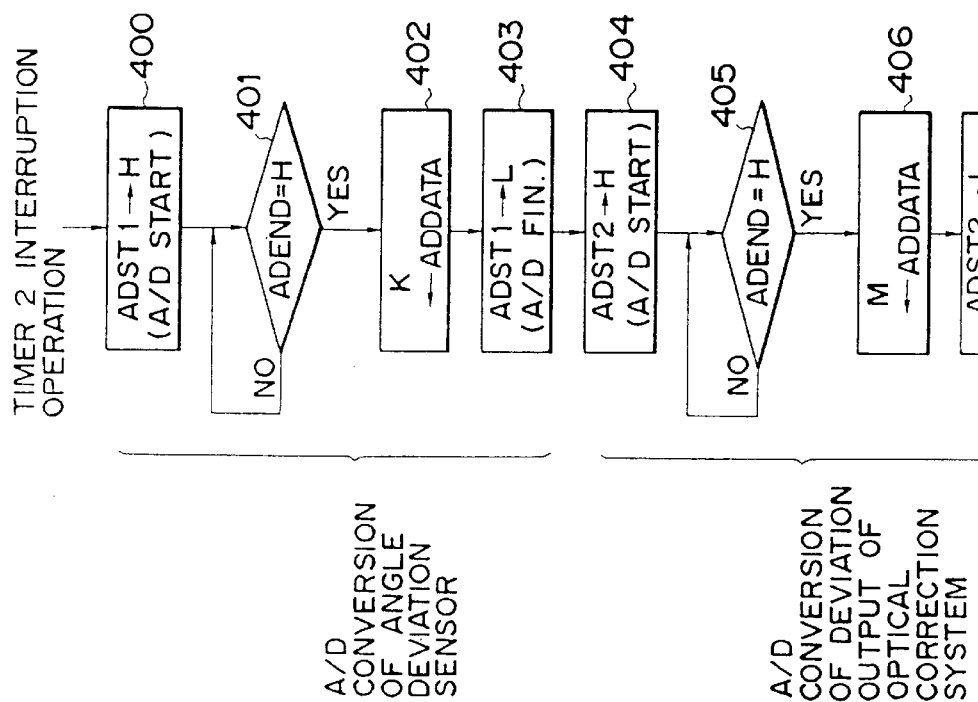

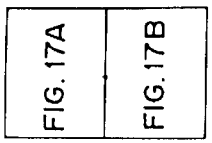
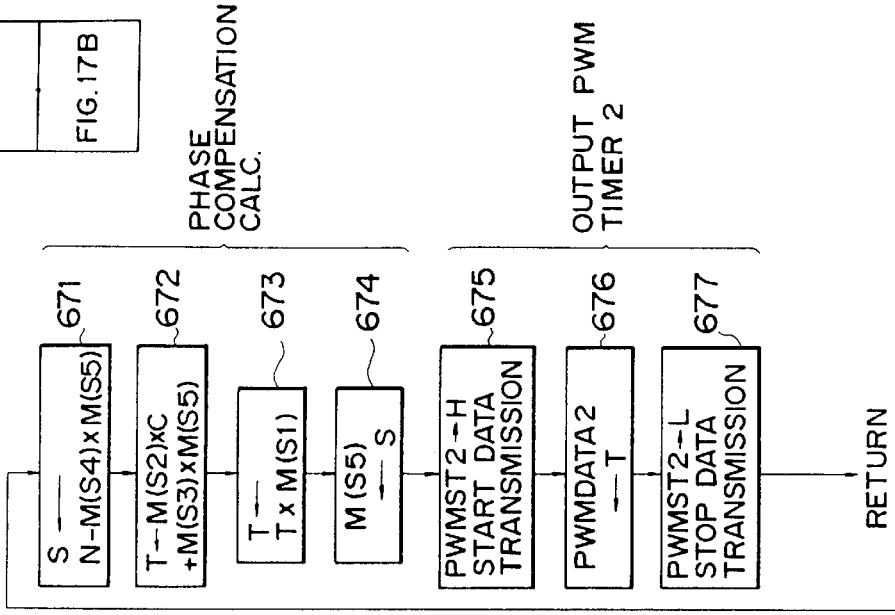
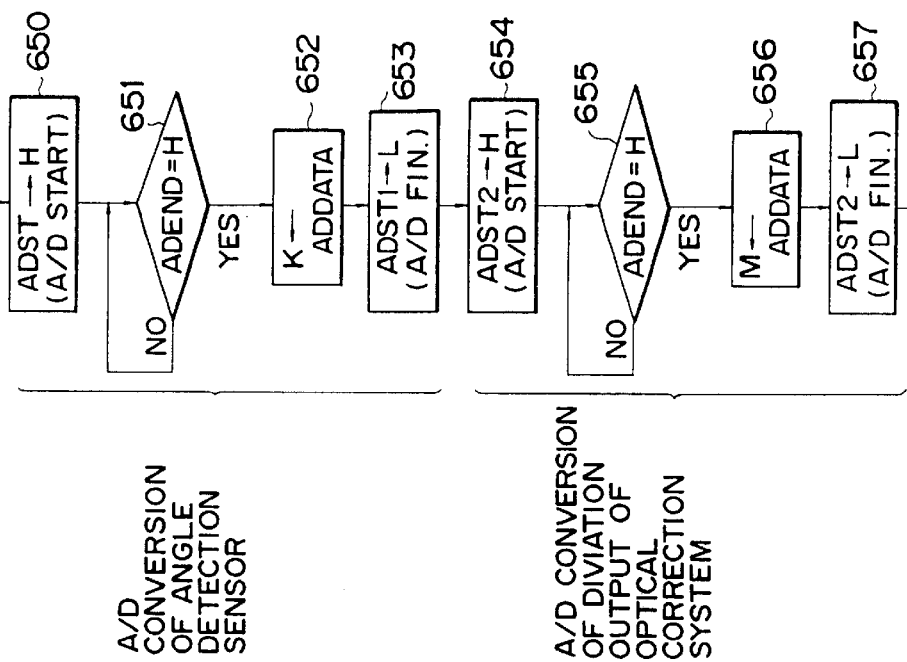

IMAGE STABILIZING DEVICE

This is a continuation application under 37 CFR 1.62 of prior application Ser. No. 08/159,934, filed Nov. 30, 1993 ABN, which is a continuation of Ser. No. 08/029,927, filed Mar. 11, 1993, which is a continuation of Ser. No. 07/700,793, filed May 15, 1991, all now abandoned.

BACKGROUND OF THE INVENTION

1. Field of the Invention

This invention relates to an image stabilizing device for preventing the image blur of an optical instrument such as a camera resulting from hand vibration.

2. Related Background Art

In recent optical instruments such as cameras, almost all of functions necessary for photographing such as the determination of exposure and focusing are automatized and failure attributable to the photographing function has become very rare, and recently, the development of cameras in which failure in photographing attributable to any other factor than the photographing function, for example, the blur of a photographed image caused by vibration such as hand vibration, is automatically suppressed has been put forward.

Usually, to prevent vibration from occurring to a photographed image even if hand vibration occurs with the release of a camera shutter, it is necessary that means capable of detecting the vibration of the camera and properly accomplishing the correction of image blur on the basis of the detected information, i.e., an image stabilizing device, be carried on the camera.

FIG. 18 of the accompanying drawings shows in schematic block diagram an example of an image stabilizing device according to the prior art. First describing the vibration detecting means, this is constructed as optical angle deviation detecting means. That is, a case 701 enclosing therein liquid whose viscosity or the like is suitably selected and provided so as to move with a camera (or a lens barrel) has therein a mechanism supporting a float 702 freely rotatable about a rotary shaft 703, and assuming, for example, that vibration has occurred to the camera (lens barrel) and this camera has rotated by $\theta_{in}$ in relative to the coordinates system of absolute space, the case 701 moves with the camera. In contrast, the liquid in the case maintains its stationary state relative to the absolute space by its inertia force. Thus, the float 702 and the case 701 have rotated by $\theta_{in}$ in corresponding to said vibration.

So, by light from a light emitting element 706 fixedly provided on the camera (lens barrel) being reflected by the float 702 and the reflected light being received by a light receiving element 705, the angle deviation of said vibration can be detected in a position detecting circuit 704 connected to the light receiving element 705.

On the other hand, description will now be made of a mechanism for making an image on the image plane apparently stationary. In the example of the prior art shown in FIG. 18, liquid having a predetermined refractive index is enclosed in an accordion-shaped container formed by connecting two transparent plates together by bellows, thereby constituting a variable vertical angle prism 707, which is used as optic axis eccentricity means. The transparent plate on the object side is suitably tilted relative to the fixed transparent plate adjacent to a photo-taking lens 708 by an actuator 713 which is a solenoid so that the photographing optic axis can be changed. That is, by the transparent plate on the object side of the variable vertical angle prism 707 rotating by $\theta_{out}$, a photographing optical path passing through the photo-taking lens 708 to the surface 709 of film rotates relative to the optic axis in proportion to said Gout and in accordance with a proportion constant determined by the refractive index of the enclosed liquid.

As described above, in the camera of FIG. 18, vibration occurring to the camera is detected by the optical angle deviation detecting means using the rotatable float 702 and the vertical angle of the variable vertical angle prism 707 is varied by an angle corresponding to the detected vibration, whereby even when the camera vibrates, the incident light from an object can always be directed to the same position on the surface 709 of the film, thereby suppressing the blur of a photographed image.

In the prior-art device of FIG. 18, the actual state of the angle deviation $\theta_{out}$ effected by the variable vertical angle prism 707 is detected by a position detecting circuit 712 disposed near the variable vertical angle prism 707, and an amount of output indicative of said angle deviation $\theta_{out}$ is subtracted from a signal indicative of the angle $\theta_{in}$ which is the output of the position detecting circuit 704 detected as the vibration of the camera, and said subtracted output is amplified by an amplifier circuit 714 and thereafter is input to a driver circuit 716 through a phase compensator circuit 715.

Accordingly, the driving of the actuator 713 is feedback-controlled thereby and accurate image stabilization control is realized.

Now, in the image stabilizing device described above with reference to FIG. 18, the starting or termination of the image stabilizing operation are effected, for example, by the ON/OFF of a manually operated switch extraneously operated which is designated by 720 in FIG. 18, and this forms means for actually starting or terminating the operation.

That is, the input from the angle deviation detecting means to the actuator 713 is effected by the ON/OFF of the manually operated switch 720.

In such a construction, when the switch 720 is closed when inputting the detection output from the above-described optical angle deviation detecting means to the driver 716 of the variable vertical angle prism (that is, starting the image stabilization), the signal indicative of the vibrated state which is detected by the angle deviation detecting means is intactly input to the driver 716.

However, such control, although not said to be unsuitable as a device which satisfies the image stabilizing function, has led to the problem that it results in a system inconvenient for use when viewed from the viewpoint of the use of the camera carrying such device thereon.

Considering, for example, a case where the switch 720 is closed with the position detection signal from the angle deviation detecting means being greatly off the usual central position and image stabilization control is started, the transparent plate on the object side of the variable vertical angle prism 707 is suddenly displaced from its inclined state to its parallel state.

This results in a sudden change in the optical path, and in a camera of a type such as TTL in which an object is seen through a viewfinder and a photo-taking optical system, there occurs the discontinuity (so-called skip) of the viewfinder image, and this has led to the disadvantage of giving the photographer a great feeling of physical disorder.

SUMMARY OF THE INVENTION

The present invention has been made in view of the above-noted circumstances and intends to provide an image stabilizing device which is provided with vibration detecting means for detecting the vibrated state of an image, vibration compensating means responsive to said vibration detecting means to compensate for the vibration of the image, connecting means for substantially connecting said vibration detecting means to said vibration compensating means, and alleviating means for preventing said vibration compensating means from effecting sudden starting of an operation responding to said vibration detecting means during said connection by said connecting means and which eliminates the above-noted problem peculiar to the prior-art image stabilizing device and also eliminates the discontinuity of a viewfinder image or the like and does not give the user a reeling of physical disorder.

Other objects of the present invention will become apparent from the following detailed description of some specific embodiments of the invention.

BRIEF DESCRIPTION OF THE DRAWINGS

FIGS. 9A, 9B and 9C are circuit diagrams analogously showing the operation of the CPU 100 of FIG. 8.

FIGS. 10 to 13B are flow charts showing the operation of the CPU 100 of FIG. 8.

FIGS. 16, 17A, and 17B are flow charts showing still another embodiment of the operation of the CPU 100 of FIG. 8.

DETAILED DESCRIPTION OF THE PREFERRED EMBODIMENTS

Figure 1:
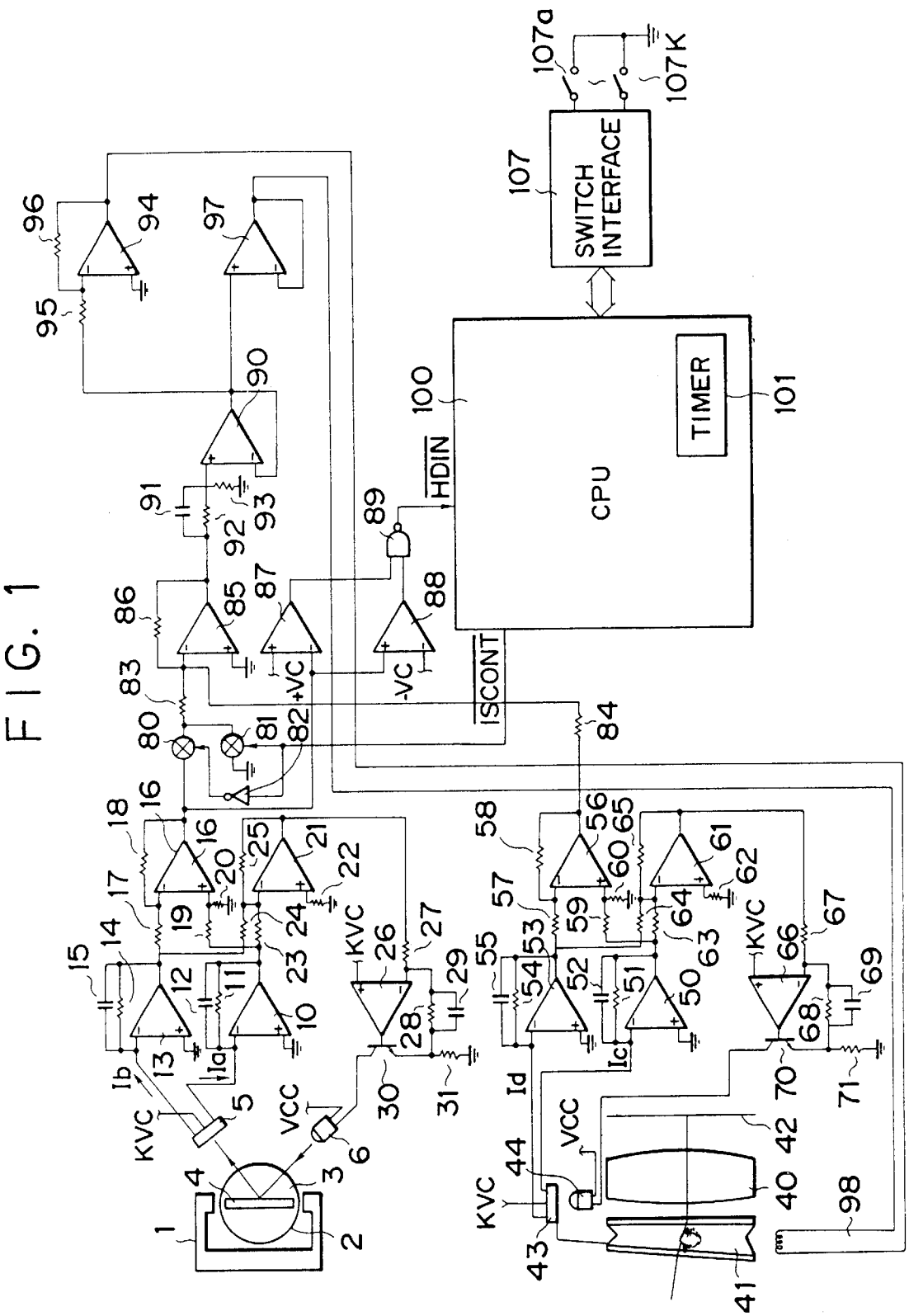
FIG. 1 is a block diagram showing the construction of an image stabilizing device according to an embodiment of the present invention.

Some embodiments of the present invention will hereinafter be described with reference to the drawings.

In FIGS. 1 to 17, common elements are given identical reference numerals for convenience and some of them will not be described in detail. Also, in the description of the flow charts of FIGS. 2, 4, 6 and 10 to 17, the numbers are indicative of the numbers of the steps of procedure.

FIG. 1 is a block diagram showing the construction of an image stabilizing device according to an embodiment of the present invention.

The device according to the present embodiment is one in which the starting and termination of the image stabilizing operation are extraneously operated by a manually operated switch.

In FIG. 1, angle deviation detecting means for detecting vibration such as hand vibration comprises a cylindrical case 2 filled with liquid 3 having a predetermined refractive index, and a float 4 of a magnetic material rotatable about a predetermined rotary shaft and provided in the liquid. The float 4 is adapted to be held in a predetermined position by a closed magnetic circuit formed by a permanent magnet 1 provided so as to surround the case 2 when there is no vibration.

When vibration occurs to a lens barrel and the float 4 rotates relative to the case 2 as described above, the amount of this rotation is detected by optical detecting means which moves with the lens barrel.

That is, signal light emitted from a light emitting element (e.g. an infrared light emitting diode IRED) 6 is reflected by the surface of the float 4 and enters a light receiving element for position detection (e.g. a semiconductor position detecting element PSD) 5 and therefore, the position of incidence of the signal light onto the light receiving element 5 is changed by said relative rotation with a result that the output currents Ia and Ib of the light receiving element 5 vary.

The output currents Ia and Ib are amplified by a current-voltage converting circuit comprised of an operational amplifier 10, a resistor 11 and a capacitor 12 and a current-voltage converting circuit comprised of an operational amplifier 13, a resistor 14 and a capacitor 15, and the respective outputs thereof are input to an addition circuit comprised of an operational amplifier 21 and resistors 22, 23, 24 and 25 and a subtraction circuit comprised of an operational amplifier 16 and resistors 17, 18, 19 and 20.

The output of the addition circuit is input to an IRED driver circuit comprised of an operational amplifier 26, resistors 27, 28, 31, a capacitor 29 and a transistor 30, and is feedback-controlled so that as a whole, the output of the addition circuit may be equal to a reference voltage KVC.

On the other hand, the amount of displacement of a variable vertical angle prism 41, as in the above-described angle deviation detecting means, is detected by a light receiving element 43 and a light emitting element 44, and photocurrents Ic and Id produced from the light receiving element 43 are amplified by a current-voltage converting circuit comprised of an operational amplifier 50, a resistor 51 and a capacitor 52 and a current-voltage converting circuit comprised of an operational amplifier 53, a resistor 54 and a capacitor 55, and are input to a subtraction circuit comprised of an operational amplifier 56 and resistors 57, 58, 59 and 60 and an addition circuit comprised of an operational amplifier 61 and resistors 62, 63, 64 and 65, respectively. The output of this addition circuit is input to an IRED driver circuit comprised of an operational amplifier 66, resistors 67, 68, 71, a capacitor 69 and a transistor 70 and therefore, the output of the addition circuit is always equal to the reference potential KVC.

The outputs of the operational amplifiers 16 and 56 obtained in the manner described above are of values corresponding to the amount of angle deviation relative to absolute space and the amount of vertical angle deviation of the variable vertical angle prism 41. The output of the operational amplifier 16 is connected to a resistor 83 through an analog switch 80 connected to an inverter 82, the output of the operational amplifier 56 is connected to a resistor 84, and both of these outputs are also connected to the inverting input terminal of an operational amplifier 85 to which a feedback resistor 86 is connected.

Also, an analog switch 81 is connected to the resistor 83 in parallel to the analog switch 80, and one input thereof is connected to the ground, thereby constituting operation control means for effecting the ON and OFF of the angle deviation detecting means and a circuit including the variable vertical angle prism 41.

The circuit comprised of the operational amplifier 85 and resistors 83, 84 and 86 is a circuit originally known as an addition circuit, but in the present embodiment, the polarity of the output representative of the movement of the variable vertical angle prism 41 is inverted relative to the output of the angle deviation detecting means and as a result, said circuit is a subtraction circuit which constitutes means for finding the amount of correction for the optic axis change of the present invention (in the present embodiment, the amount of driving of the deviation of the vertical angle of the variable vertical angle prism 41).

Next, the output of the operational amplifier 85 is input to a phase advance compensation circuit comprised of a capacitor 91 and resistors 92 and 93, and is input to a buffer amplifier 90 after the phase compensation of the entire feedback system is effected. One output of this buffer amplifier is input to a power amplifying circuit comprised of an operational amplifier 97. The other output is input to a power amplifying circuit of the inversion type comprised of an operational amplifier 94 and resistors 95 and 96.

The outputs of these two power amplifying circuits are then input to a coil 98 which is an actuator for the variable vertical angle prism, and control for changing the vertical angle of the variable vertical angle prism 41 is effected by the operation of the coil 98. In the present embodiment, the buffer amplifier 90, the two power amplifying circuits and the coil together constitute optic axis changing means for changing (rotating) of the optic axis.

The outputs of a comparator 87 and a comparator 88 are connected to the input $\overline{\text{HDIN}}$ to a CPU 100 through a NAND gate 89.

A positive reference voltage Vc is connected to the non-inverting input terminal of the comparator 87 and a negative reference voltage −Vc is connected to the inverting input terminal of the comparator 88, thereby constituting a so-called window comparator which compares the output of the operational amplifier 16 with the reference voltages and whose input $\overline{\text{HDIN}}$ assumes an L level only when the output of the operational amplifier 16 falls within the range of Vc and −Vc.

Further, in the present embodiment, extraneously operated switches 107a–107k are connected through a switch interface 107 to the CPU 100 comprised of a microcomputer or the like so that the states of the switches 107a–107k may be transmitted to the CPU 100.

By the construction as described above, the angle deviation driving of the variable vertical angle prism 41 corresponding to the relative angle deviation of the float 4 is effected even if the lens barrel is moved by hand vibration or the like, and thus the object image on the image plane of the camera can keep its stationary state.

The operations of the starting and termination of the image stabilizing operation in the present embodiment will now be described with reference to the flow chart of FIG. 2 which shows the operation of the CPU 100.

First, the CPU 100 starts its initial operation by a power on reset circuit, not shown, and sets a port output $\overline{\text{ISCONT}}$ to an H level. In this state, the output of the inverter 82 assumes an L level and therefore, the analog switch 80 becomes OFF and the analog switch 81 becomes ON, and the operation of the variable vertical angle prism 41 is isolated from the signal from the angle deviation detecting means and remains in a state stationary at the center position, and the image stabilizing operation is maintained in its OFF state. Also, in the initial operation, the value of the latch ISONL of the CPU 100 which memorizes the state of each switch is set to an L level (steps 200 and 201).

Subsequently, the state of this latch ISONL is judged (a step 202), and if the value of this latch is at an L level, advance is made to a step 203, and if said value is at an H level, advance is made to a step 210.

Steps 203–209 are the starting routine of the image stabilizing operation, and at the step 203, the state of the extraneously operated switch 107a (hereinafter referred to as ISSW) shown in FIG. 1 which indicates the starting and termination of the image stabilizing operation is read through the switch interface 107. If ISSW is OFF, it is judged that the state of ISSW remains OFF and has not changed from the OFF state, and return is made to the step 202, but if ISSW is ON, it is judged that the state of ISSW has changed from OFF to ON, and advance is made to the step 204, where the control for starting the image stabilizing operation is started.

At the step 204, a timer 101 contained in the CPU 100 is started, and subsequently at the step 205, the state of the input $\overline{\text{HDIN}}$ is judged.

As long as the output of the angle deviation detecting means is greater than the reference voltage Vc or smaller than the reference voltage −Vc, the output of the window comparator, i.e., the signal of the input $\overline{\text{HDIN}}$ to the CPU 100, is at an H level and at this time, advance is made to the step 206, and when said output has come into between the reference voltages Vc and −Vc, the signal of the input $\overline{\text{HDIN}}$ assumes an L level, and at this time, advance is made to the step 207.

At the step 206, whether the timer 101 has reached a predetermined time $T_E$ is judged, and if it has not reached $T_E$, return is made to the step 205, and if it has reached $T_E$, it means that within a set time, said output has never fallen within the range of the reference voltages Vc and −Vc, but if the judging operation is continued any further, the time lag of the starting of the image stabilizing operation will become too long and therefore, the judging operation is terminated and advance is made to the step 207.

At the step 207, the port output $\overline{\text{ISCONT}}$ is set to an L level, whereby the analog switch 81 becomes OFF and the analog switch 80 becomes ON, and the output of the angle deviation detecting means is connected to the coil 98, and the image stabilizing operation is started.

Then, at the step 208, the latch ISONL is set to an H level to thereby cause it to memorize the states of the switches, and at the step 209, the timer is stopped and return is made to the step 202.

Steps 210–216 are the termination routine of the image stabilizing operation. If at the step 202, the latch ISONL is at an H level, advance is made to the step 210, where the state of ISSW is judged. If ISSW is ON, return is made to the step 202, but if ISSW is OFF, it is judged that ISSW has changed from ON to OFF, and advance is made to the step 211, where the control for terminating the image stabilizing operation is started.

At the step 211, the timer 101 is started and then, at the step 212, the state of the input $\overline{\text{HDIN}}$ is judged.

As in the case of the steps 205–206, as long as the value of the operational amplifier 16 which is the output of the angle deviation detecting means is greater than the reference voltage Vc or smaller than the reference voltage −Vc, the signal of the input $\overline{\text{HDIN}}$ is at an H level and at this time, advance is made to the step 213, and when said output has fallen within the range of the reference voltges Vc and −Vc, the signal of the input $\overline{\text{HDIN}}$ assumes an L level, and at this time, advance is made to the step 214.

At the step 213, whether the value of the timer 101 has reached 9 predetermined time $T_F$ is judged, and if it has not reached $T_F$, return is made to the step 212, and if it has reached $T_F$, the time lag of the termination of the image stabilizing operation will become too long if the judging operation is continued any further and therefore, the judging operation is terminated and advance is made to the step 214.

At the step 214, the port output $\overline{\text{ISCONT}}$ is set to an H level and the analog switch 80 is rendered OFF and the analog switch 81 is rendered ON, whereby the output of the angle deviation detecting means is disconnected from the coil 98, and the image stabilizing operation is terminated.

Subsequently, at the step 215, the latch ISONL is set to an L level to thereby cause it to memorize the states of the switches, and at the step 216, the timer 101 is stopped, whereafter return is made to the step 202.

In the construction described above, the values of the reference voltages Vc and -Vc are set to values very approximate to the ground level and therefore, the amount of shift when the image stabilizing operation has changed from OFF to ON (the steps 203–209) is small and the detected hand vibration is usually a periodic signal and thus, the output of the angle deviation detecting means crosses the ground level at an interval of several seconds without fail and therefore, the continuous shift of the operation becomes possible even if there is lesser time delay.

This also holds true when the image stabilizing operation has changed from ON to OFF, and the image stabilizing operation is terminated at a point of time at which the output of the angle deviation detecting means has fallen within a predetermined range and therefore, discontinuity of the viewfinder image does not occur.

Figure 3:
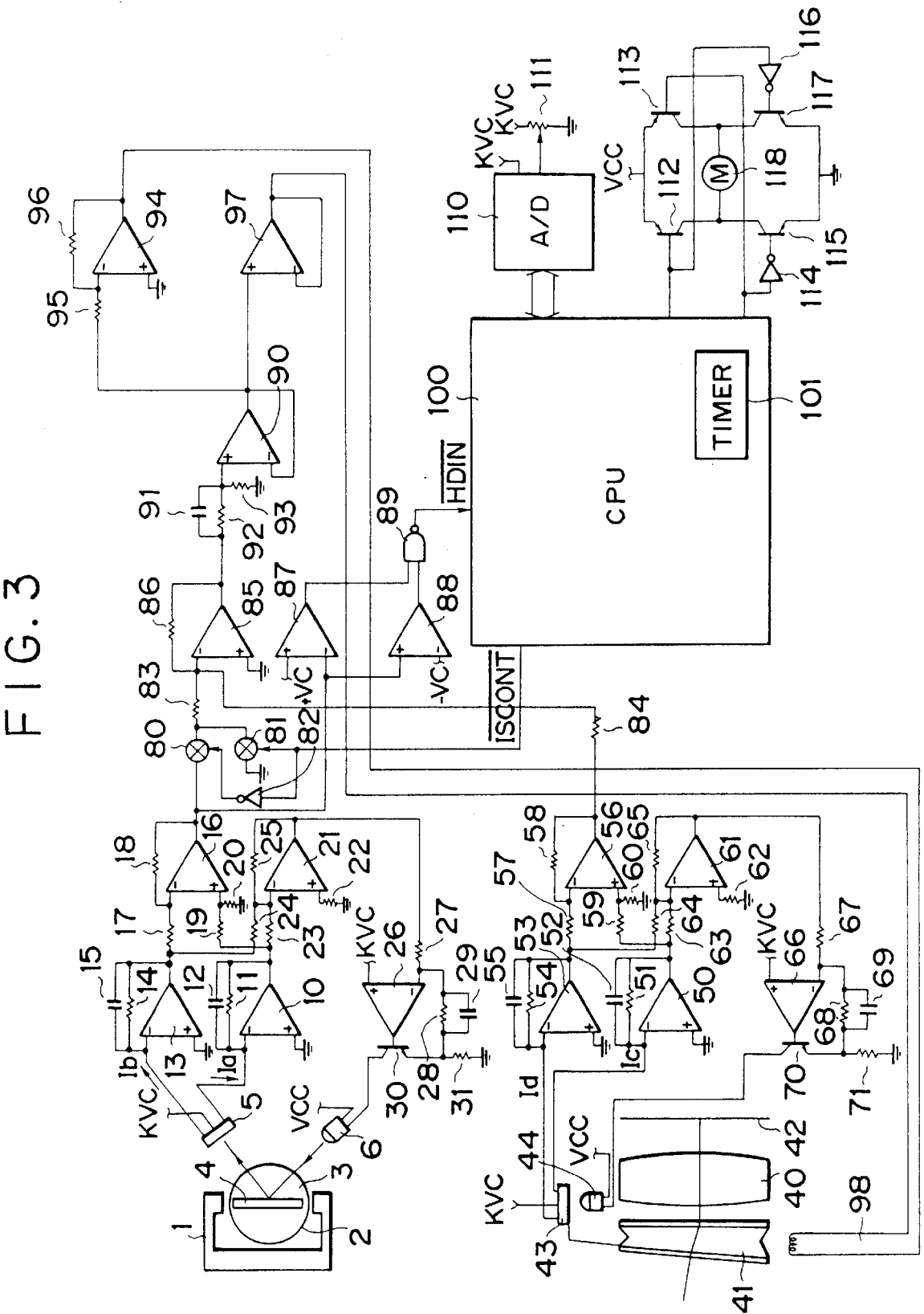
FIG. 3 is a block diagram showing the construction of an image stabilizing device according to another embodiment of the present invention.

FIG. 3 is a block diagram showing the construction of an image stabilizing device according to another embodiment of the present invention. In the present embodiment, signalling from outside for starting and terminating the image stabilizing operation is effected on the basis of the zoom position of the photo-taking lens.

That is, the image vibration by a camera shake such as hand vibration is more apt to occur as the focal length of the photo-taking lens becomes longer and therefore, the present embodiment intends to automatically control the starting and termination of the image stabilizing operation depending on whether the focal length of the photo-taking lens is a focal length for which the image vibration is apt to occur.

The reference numerals 1–107 in FIG. 3 in designate elements identical to those in FIG. 1, and the reference numerals 110–118 denote constructions related to a zoom mechanism which is the characteristic construction of the present embodiment.

That is, in FIG. 3, the reference numeral 111 designates a variable resistor whose resistance value is set so as to be variable in conformity with the zoom position of the photo-taking lens, and a voltage set by the variable resistor 111 of a reference voltage KVC is input to an A/D converter 110, and this provides an input to the CPU 100.

Also, a bridge circuit constituted by transistors 112, 113, 115 and 117 constitutes a motor driver circuit for a motor 118 which actually governs the zooming of the photo-taking lens, and determines the direction of zooming by a control signal from the CPU 100.

The operations of starting and terminating the image stabilizing operation in the present embodiment will now be described with reference to the flow chart of FIG. 4 which shows the operation of the CPU 100.

Figure 2:
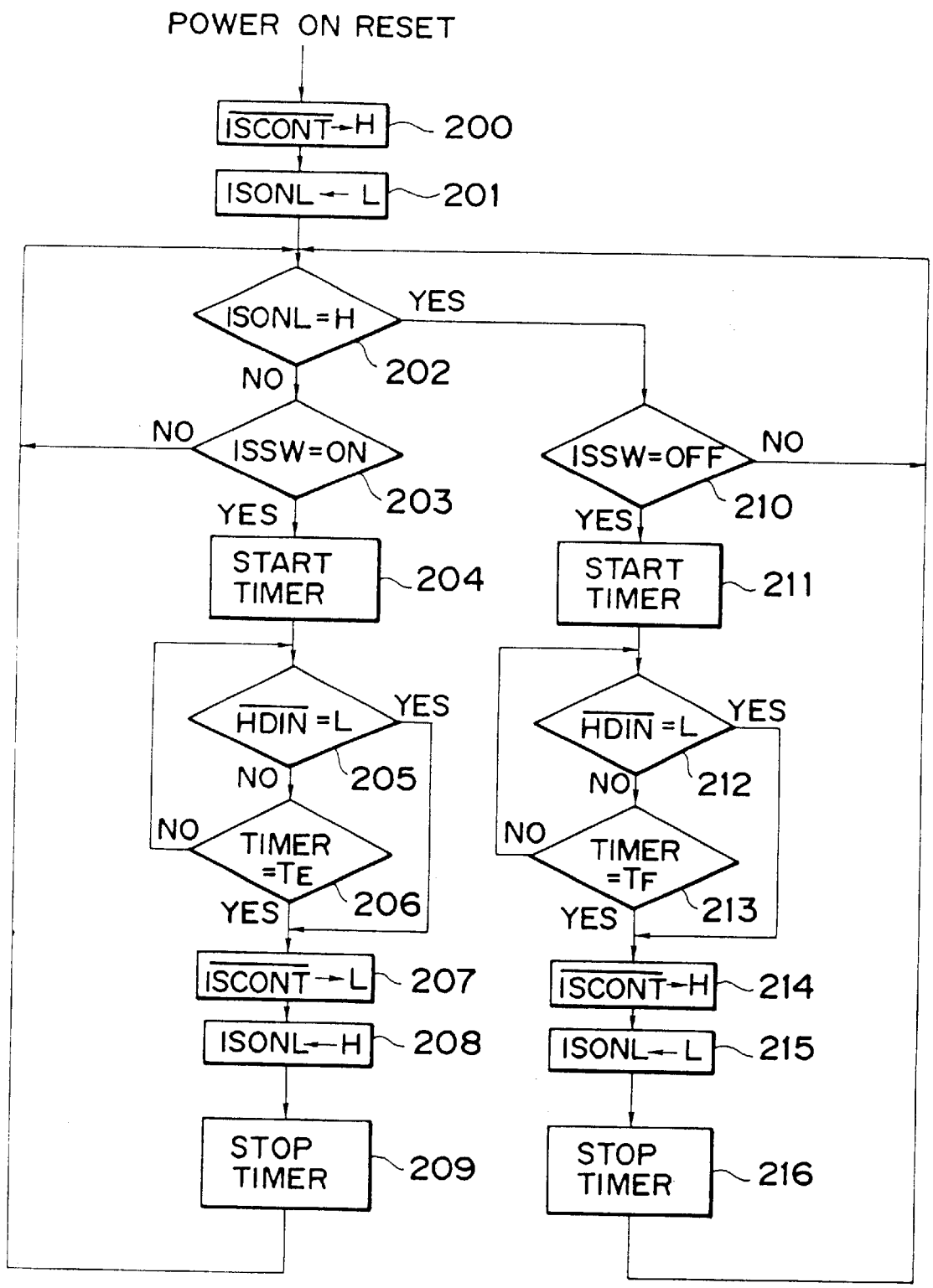
FIG. 2 is a flow chart showing the operation of the CPU 100 of FIG. 1.
Figure 4:
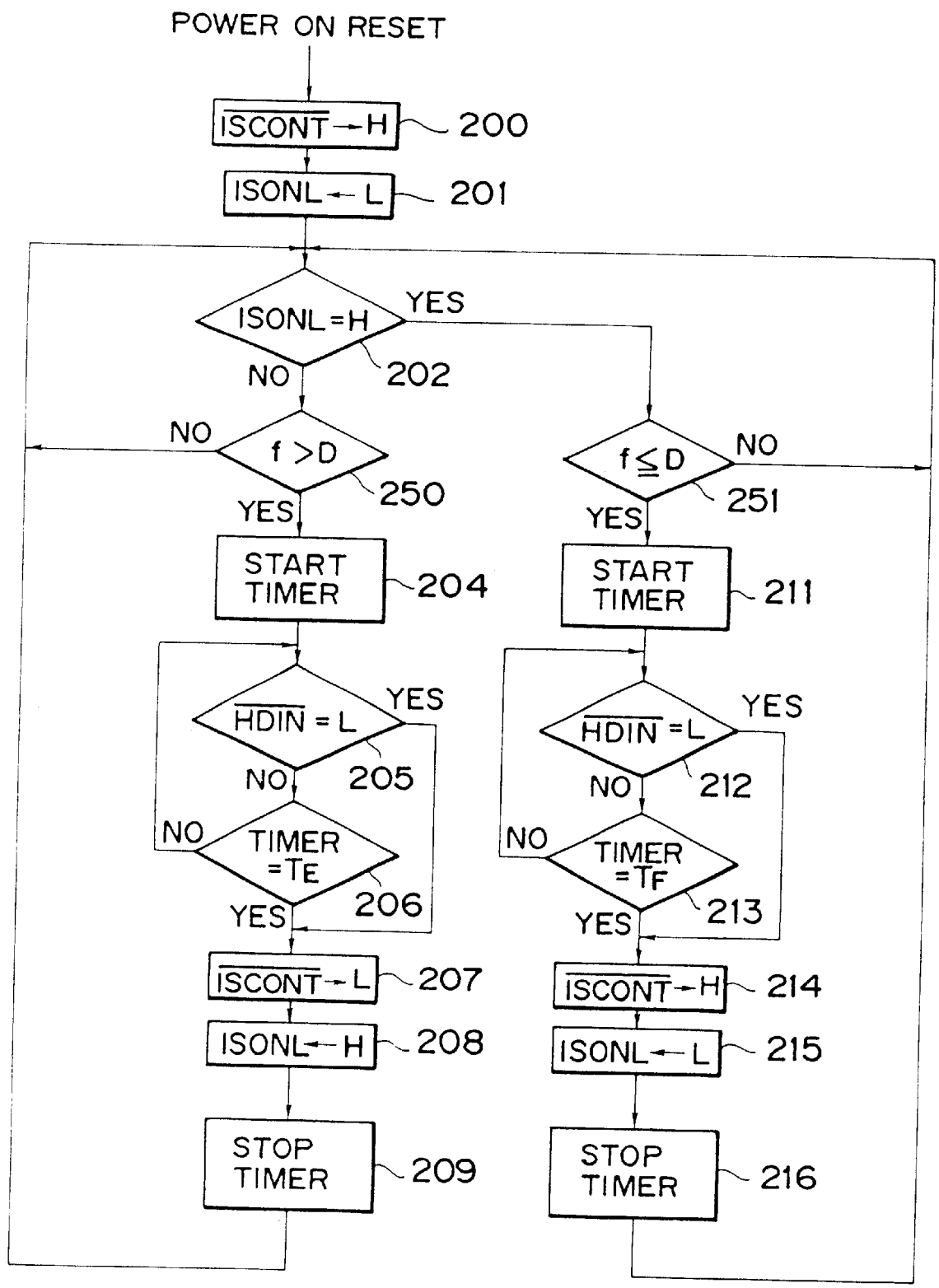
FIG. 4 is a flow chart showing the operation of the CPU 100 of FIG. 3.

In FIG. 4, steps 200–202 are the same as those in FIG. 2, and if the latch ISONL is at an L level, advance is made to a step 250, and if the latch ISONL is at an H level, shift is made to a step 251.

At the step 250, the zoom position of the photo-taking lens is judged for the starting of the image stabilizing operation.

That is, assuming that by preset zooming control, the photo-taking lens has been moved from the WIDE side to the TELE side, if the zoom position f is smaller than a predetermined value D (which becomes greater toward the TELE side), return is made to the step 202, but when the zoom position moves to the TELE side and the value of f becomes greater than D, advance is made to a step 204.

The step 204 to step 209 are the starting routine of the image stabilizing operation, and as described in the previous embodiment, the image stabilizing operation is started at a point of time at which the output of the angle deviation detecting means has fallen within a predetermined level range.

At a step 251, the zoom position of the photo-taking lens is judged for the termination of the image stabilizing operation.

That is, assuming that by preset zooming control, the photo-taking lens has been moved from the TELE side to the WIDE side, if the zoom position f is greater than the predetermined value D, return is made to the step 202, but when the zoom position moves to the WIDE side and the value of f becomes smaller than D, advance is made to a step 211.

The step 211 to step 216 are the termination routine of the image stabilizing operation, and as described in the previous embodiment, the image stabilizing operation is terminated at a point of time whereat the output of the angle deviation detecting means has fallen within a predetermined level range.

Accordingly, again in the present embodiment, as in the previous embodiment, discontinuity of the viewfinder image occurs during neither of the starting and termination of the image stabilizing operation.

Figure 5:
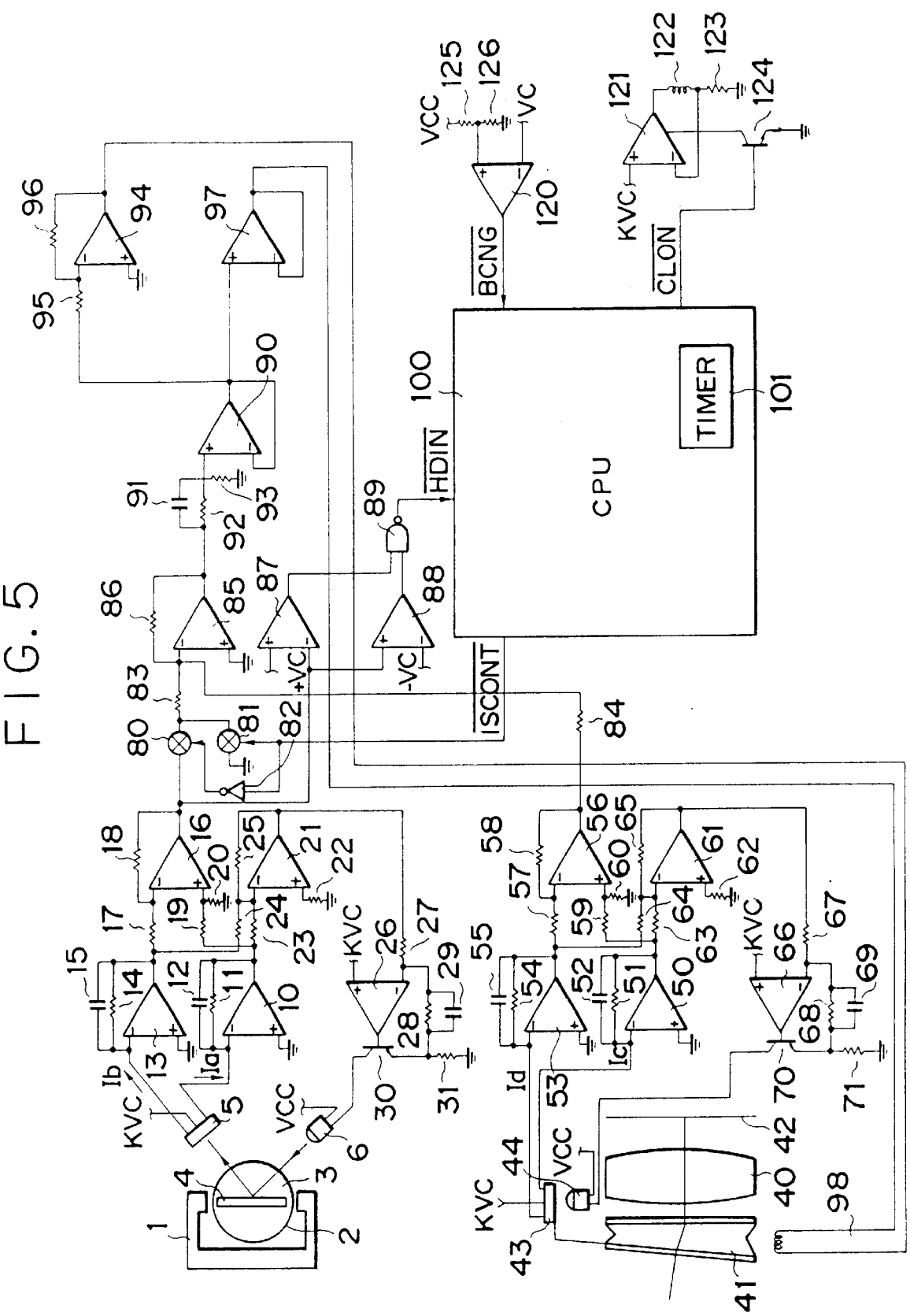
FIG. 5 is a block diagram showing the construction of an image stabilizing device according to still another embodiment of the present invention.

FIG. 5 shows the construction of an image stabilizing device according to still another embodiment of the present invention.

The present embodiment is such that the image stabilizing operation is terminated when the source voltage has become a voltage inappropriate to perform the image stabilizing operation, as when the source voltage has been reduced by other loads such as the feeding of the film and the driving of the lens, and that the image stabilizing operation is started when this not the case.

The reference numerals 1–107 in FIG. 5 designate elements identical to those in FIG. 1, and the reference numerals 120–126 denote elements related to the construction of source voltage monitoring means which is the feature of the present embodiment.

In FIG. 5, a value obtained by dividing the source voltage Vcc by resistors 125 and 126 is input to the non-inverting input terminal of a comparator 120, and a reference voltage Vc is connected to the non-inverting input terminal and the output $\overline{\text{BCNG}}$ of the comparator 120 is input to the CPU 100.

Also, a constant current circuit constituted by an operational amplifier 121 and a resistor 123 supplies a constant current to a coil 122 for the feeding of the film, the driving of the lens, etc., and the ON/OFF control of the operational amplifier 121 is effected by the output $\overline{\text{CLON}}$ of the CPU 100 through a transistor 124.

The operations of starting and terminating the image stabilizing operation in the present embodiment will now be described with reference to the flow chart of FIG. 6 which shows the operation of the CPU 100.

Figure 6:
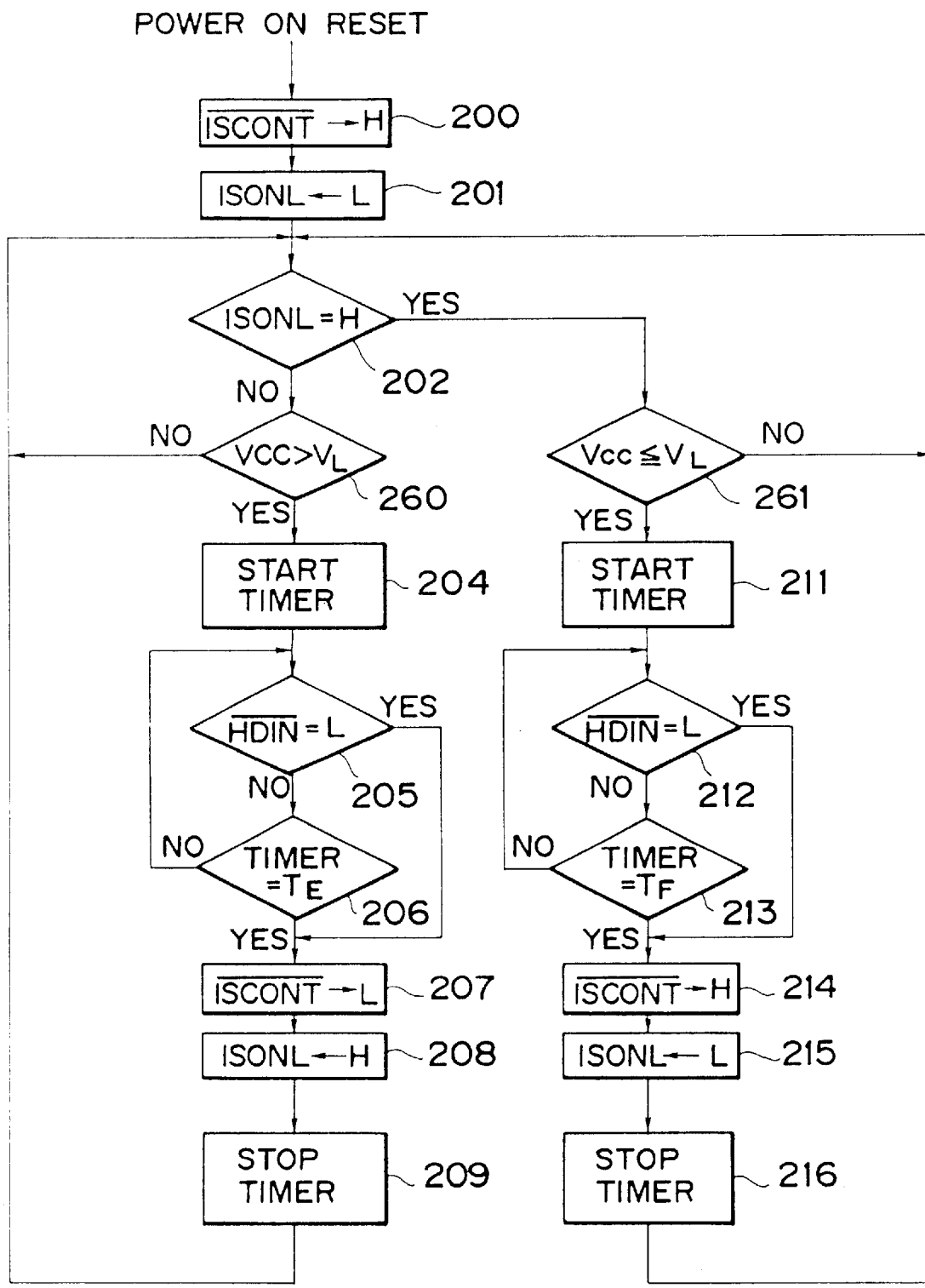
FIG. 6 is a flow chart showing the operation of the CPU 100 of FIG. 5.

In FIG. 6, steps 200–202 are the same as those in FIG. 2 and form the starting routine of the image stabilizing operation. If the latch ISONL is at an L level, advance is made to a step 260, and if the latch ISONL is at an H level, shift is made to a step 261.

At the step 260, whether the source voltage Vcc is greater than a predetermined level Vc is judged.

If the output $\overline{\text{CLON}}$ of the CPU 100 is at an L level in advance and with the coil 122 energized, the value of the source voltage Vcc is smaller than the predetermined level Vc, return is made to the step 202, but if said value is greater than the predetermined level Vc, advance is made to a step 204. At the step 204 to step 209, as in the case of FIG. 2, the image stabilizing operation is started at a point of time at which the output of the angle deviation detecting means has fallen within a predetermined level range.

Also, if at the step 202, the latch ISONL is at an H level, advance is made to a step 261.

Steps 261 and 211–216 are the termination routine of the image stabilizing operation, and at the step 216, whether the value of the source voltage Vcc is below a predetermined level is judged, and if the source voltage Vcc is greater than the predetermined level Vc, return is made to the step 202, where the image stabilizing operation is continued, but if the source voltage Vcc becomes smaller than the level Vc, advance is made to the step 211.

At the step 211 to the step 216, as in the case of FIG. 2, the image stabilizing operation is terminated at a point of time at which the output of the angle deviation detecting means has fallen within a predetermined level range.

Accordingly, again in the present embodiment, as in the previous embodiments, discontinuity of the viewfinder image occurs during neither of the starting and termination of the image stabilizing operation.

In each of the above-described embodiments, in order to shorten the time lag during the starting or the termination of the image stabilizing operation, the angle deviation detecting means may be forcibly driven by driving means like that in the following embodiment so that the output thereof may fall within a predetermined level in a short time.

Figure 7:
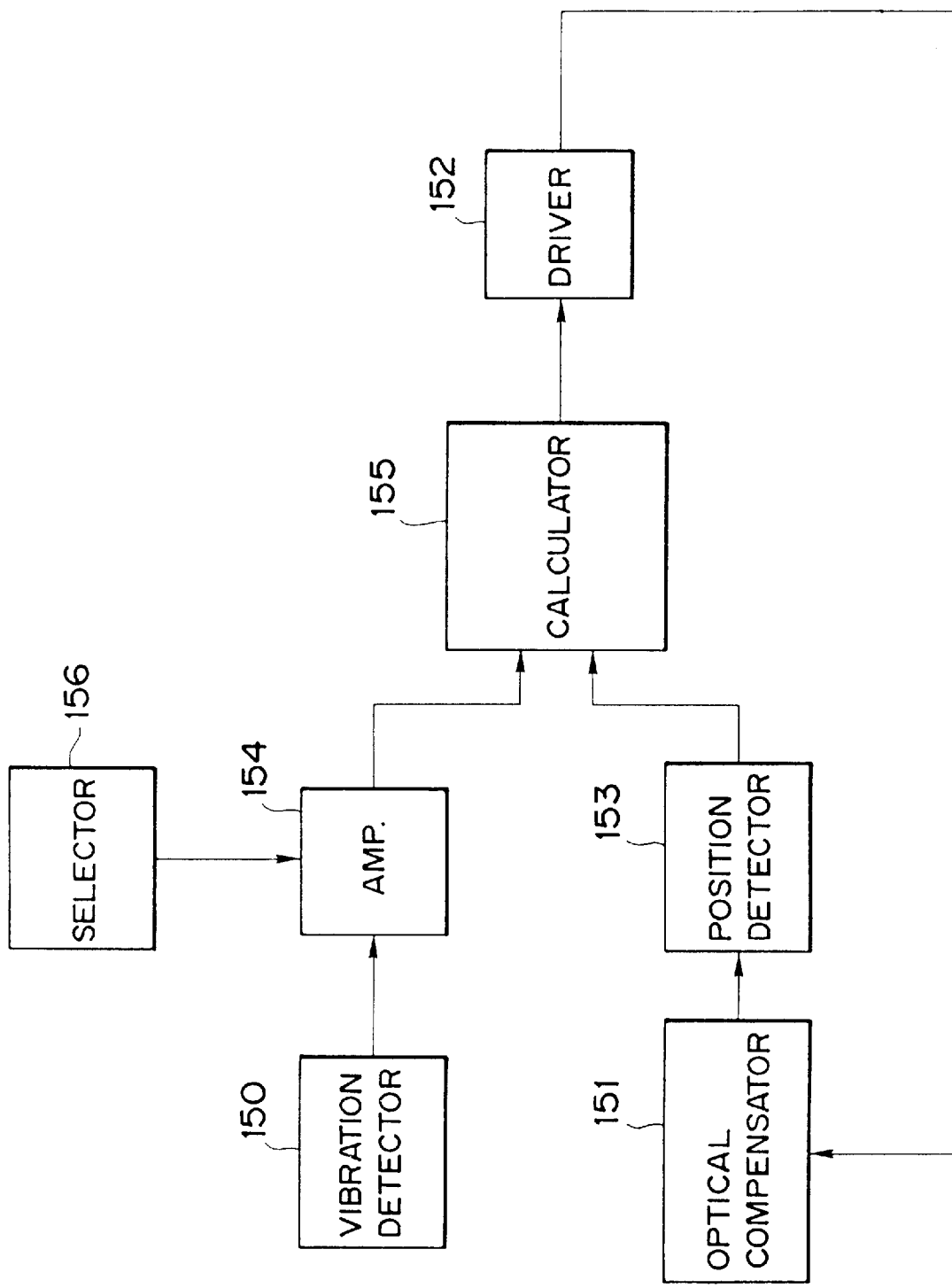
FIG. 7 is a block diagram schematically showing the construction of an image stabilizing device according to yet still another embodiment of the present invention.

FIG. 7 is a block diagram schematically showing the construction of an image stabilizing device according to yet still another embodiment of the present invention. In FIG. 7, the output of vibration detector means 150 for detecting the amount of deviation relative to the absolute space of the camera is input to amplifier means 154 whose amplification rate varies for a predetermined time depending on the state of selector means 156, and the output of this amplifier means is input to calculator means 155. On the other hand, the amount of movement of optical compensator means 151 for compensating for the vibration of an image through the photo-taking lens is detected by position detector means 153, the output of which is input to the calculator means 155. In the calculator means 155, calculation is effected on the basis of the output of the amplifier means 154 and the output of the position detector means 153, and the output of the calculator means 155 is input to driver means 152. The driver means 152 drives the optical compensator means 151 and forms a feedback loop as shown.

Figures 8, 8A:
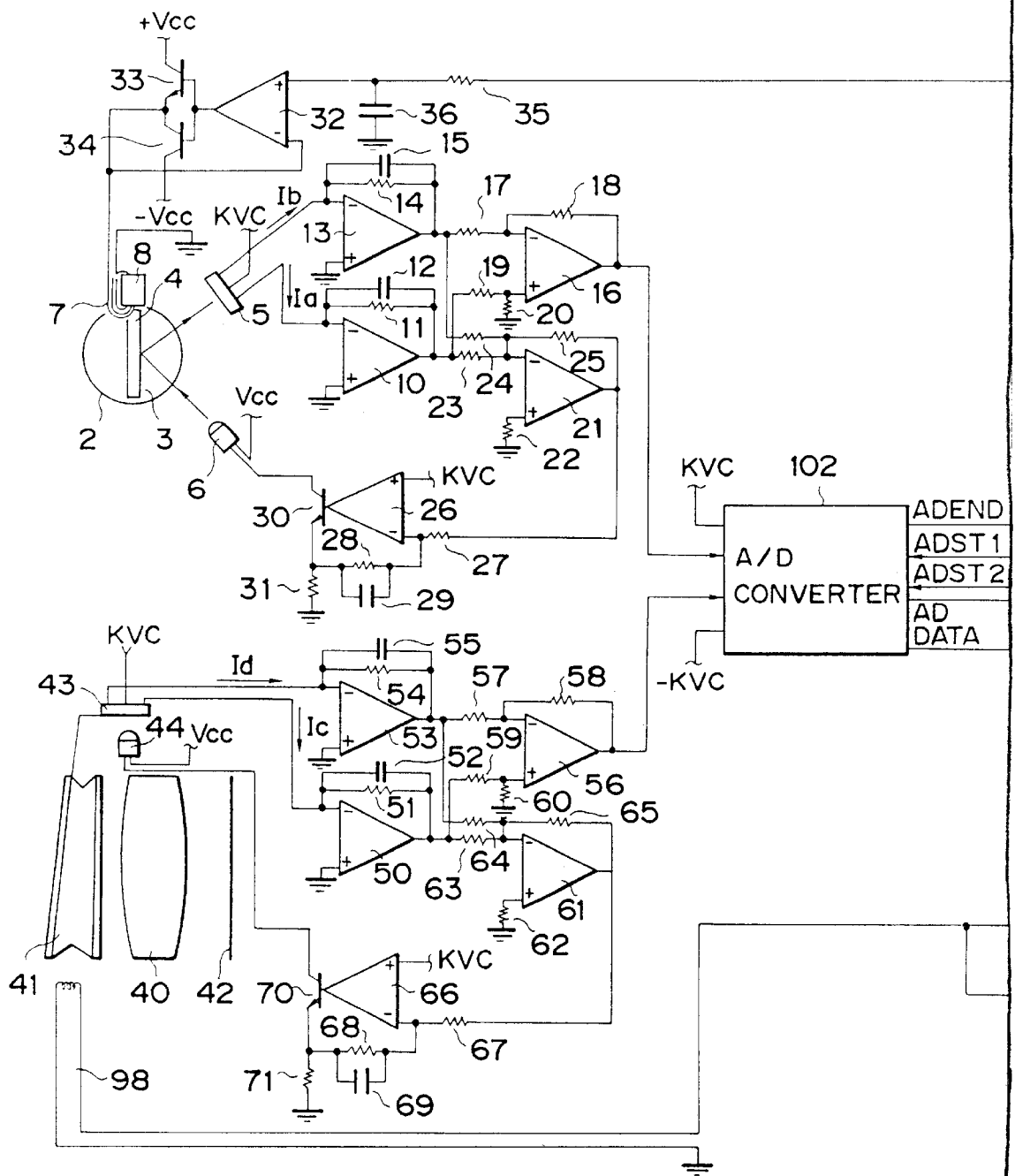
FIGS. 8A and 8B is a circuit diagram showing the specific construction of FIG. 7.
Figure 8B:
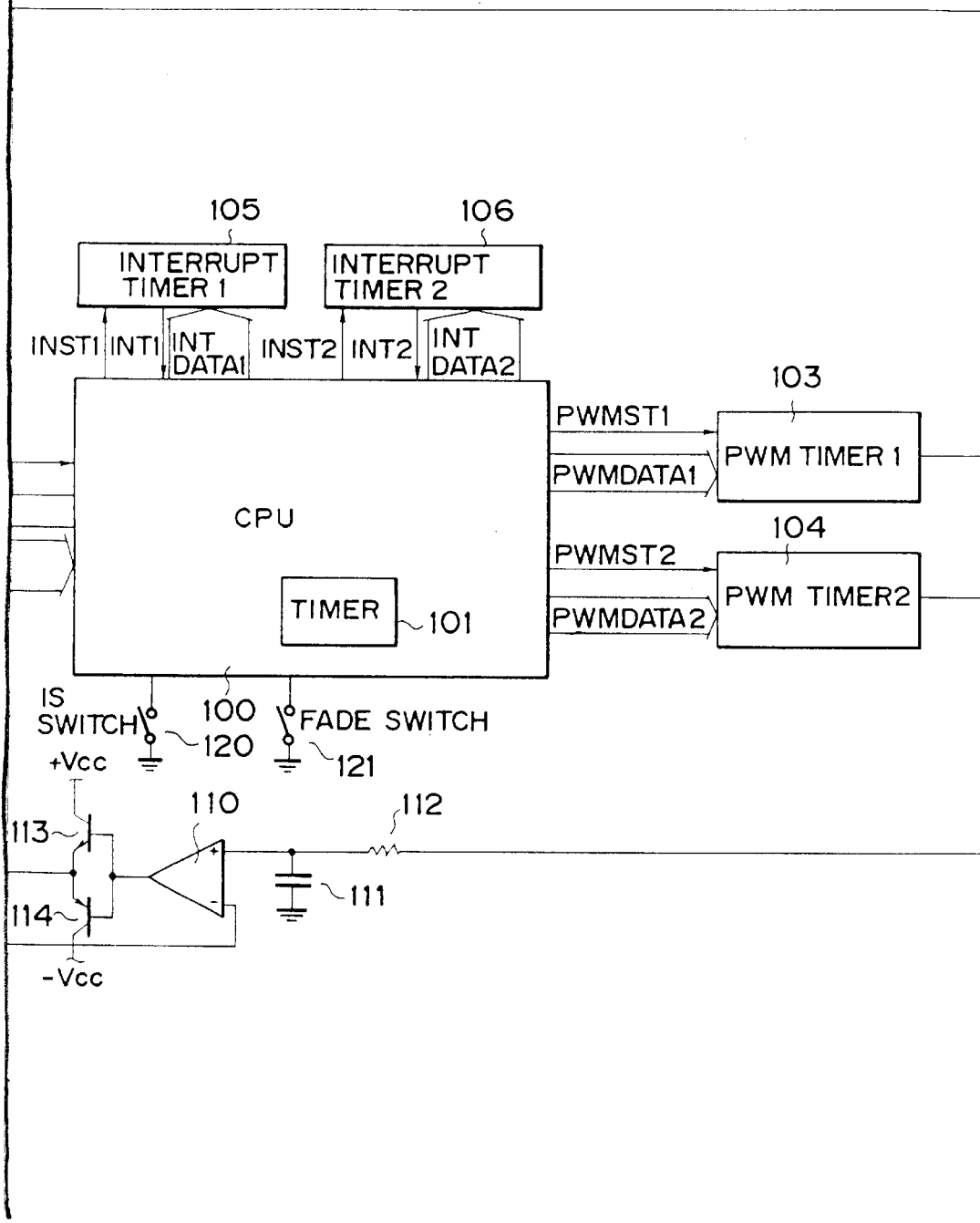

An embodiment of the specific construction of FIG. 7 is shown in FIG. 8.

The construction of FIG. 8 is similar to the construction of FIG. 1, except for the points which will hereinafter be described.

In FIG. 8, the reference numeral 102 designates an A/D converter to which a positive reference voltage KVC and a negative reference voltage –KVC are input as reference voltage levels. The angle deviation output of the angle deviation detecting means is A/D-converted by the input of a control signal ADST1 from the CPU 100, and the amount of angle deviation of the variable vertical angle prism 41 is A/D-converted by the input of a control signal ADST2 from the CPU 100. At the end of the A/D-converting operation, the output ADEND thereof assumes an H level and the result of the A/D conversion is transmitted to the CPU 100 through ADDATA.

The reference numeral 105 denotes an interrupt timer 1 which applies the interrupt operation to the CPU 100 at a predetermined time interval $T_1$ to execute the A/D-converting operation for the amount of angle deviation of the angle deviation detecting means and the control calculation for the angle deviation detecting means.

The reference numeral 106 designates an interrupt timer 2 which applies the interrupt operation to the CPU 100 at a predetermined time interval $T_2$ to effect the A/D converting operation for the amount of angle deviation of the angle deviation detecting means and the amount of angle deviation of the variable vertical angle prism 41 and the phase compensation calculation for executing the feedback control of the variable vertical angle prism.

The reference numeral 103 denotes PWM timer 1 which receives from the CPU 100 the result of the control calculation to the angle deviation detecting means effected in the CPU 100, outputs a value corresponding to said result by varying the duty cycle in a predetermined periodic clock, and determines a driving current value to a driver circuit for the angle deviation detecting means which will be described later.

The reference numeral 104 designates PWM timer 2 which receives from the CPU 100 the result of the control calculation for the amount of angle deviation of the variable vertical angle prism 41 calculated in the CPU 100, outputs a value corresponding to said result by varying the duty cycle in a predetermined periodic clock, and determines a driving current value to a driver circuit for driving the variable vertical angle prism which will be described later.

A power amplifying circuit comprised of an operational amplifier 32 and transistors 33 and 34 is a driver circuit for the angle deviation detecting means for supplying a predetermined electric current to a driving coil 7 integral with a yoke 8 fixed to the case 2 for controlling the characteristic of the angle deviation detecting means, and supplies the coil 7 with an electric current corresponding to the duty cycle value of the PWM timer 1 because the output of the PWM timer 1 is converted into an analog voltage by a low-pass filter comprised of a resistor 35 and 1S a capacitor 36 and that analog potential is connected to the non-inverting input terminal of the operational amplifier 32, whereby the movement characteristic of the float 3 is controlled by Lorentz's force and the vibration detection characteristic of the angle deviation detecting means is rendered adequate.

A power amplifying circuit comprised of an operational amplifier 110 and transistors 113 and 114 is a driver circuit for the variable vertical angle prism for supplying a predetermined electric current to a driving coil 98 for controlling the driving of the variable vertical angle prism 41, and supplies the coil 98 with an electric current corresponding to the duty cycle value of the PWM timer 2 because the output of the PWM timer 2 is converted into an analog voltage by a low-pass filter comprised of a resistor 112 and a capacitor 113 and that analog potential is connected to the non-inverting input terminal of the operational amplifier 110, whereby the variable vertical angle prism 41 is driven for image vibration compensation. The reference numeral 120 designates an extraneously operated IS switch for directing the starting and termination of the image stabilizing operation, and the reference numeral 121 denotes an extraneously operated FADE switch for gradually connecting or disconnecting the output of the angle deviation detecting means to the feedback loop of the variable vertical angle prism 41 and selecting whether the discontinuity of the viewfinder image should be prevented.

The operation of the construction of FIG. 8 will now be described with reference to the flow charts of FIGS. 10, 11, 12 and 13 which show the operation of the CPU 100.

Figure 10:
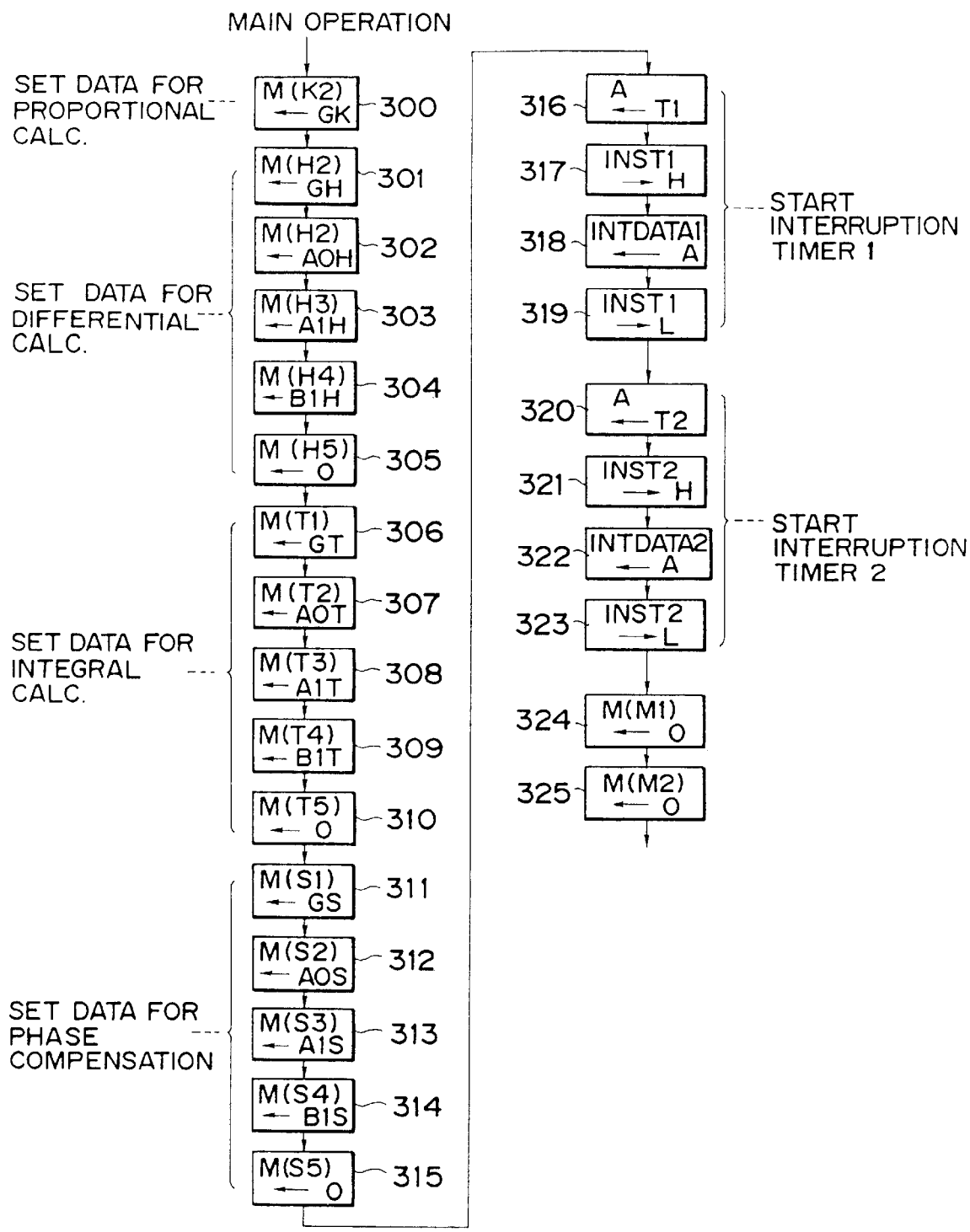

First, in FIG. 10, each coefficient data for executing the digital calculation in the CPU 100 is read out from an ROM in the CPU 100 and is set in an internal memory. In a flow 300, the gain GK of a proportional term for controlling the coil 7 of the angle deviation detecting means is first set in an internal memory M(k1).

Subsequently, in flows 301–305, calculation data for effecting the differential control of the coil 7 of the angle deviation detecting means is set in each internal memory, and in the flow 301, the gain GH of a differential term is set in an internal memory M(H1). Subsequently, a coefficient for effecting actual differential calculation is set by flows 302–304, and here, analogously expressing a differentiation circuit, it is expressed by a primary advance circuit as shown in FIG. 9A (for a frequency sufficiently lower than a pole frequency, the same as a differentiation circuit), and expressing the frequency characteristic H(S) as the coefficient of H(Z) on Z-plane by the use of known S-Z conversion, with the sample time interval as $T_1$, it is:

$$A0H = \frac{\frac{2}{T_1}}{\frac{1}{C_1 R_1} + \frac{2}{T_1}}$$

$$A1H = \frac{-\frac{2}{T_1}}{\frac{1}{C_1 R_1} + \frac{2}{T_1}}$$

$$B1H = \frac{\frac{1}{C_1 R_1} - \frac{2}{T_1}}{\frac{1}{C_1 R_1} + \frac{2}{T_1}}$$

Accordingly, in the flow 302, the constant data A0H is set in a memory M(H2), and in the flow 303, the constant data A1H is set in a memory M(H3), and in the flow 304, the constant data B1H is set in a memory M(H4), and further in the flow 305, an internal memory M(H5) for memorizing the intermediate result of calculation is reset to 0.

Subsequently, in flows 306–310, calculation data for effecting the integral control of the coil 7 of the angle deviation detecting means is set in each internal memory, and first in the flow 306, the gain GT of an integral term is set in an internal memory M(T1). Next, a coefficient for effecting actual integral calculation is set by the flows 307–309, and here, analogously expressing an integration circuit, it is expressed by a primary delay circuit as shown in FIG. 9B (for a frequency sufficiently higher than the pole frequency, the same as an integration circuit), and expressing the frequency characteristic H(S) thereof as the coefficient of H(Z) on Z-plane by the use of known S-Z conversion, with the sampling time interval as $T_1$, it is:

$$A0T = \frac{\frac{1}{C_2 R_2}}{\frac{1}{C_2 R_2} + \frac{2}{T_1}}$$

$$A1T = \frac{\frac{1}{C_2 R_2}}{\frac{1}{C_2 R_2} + \frac{2}{T_1}}$$

$$B1T = \frac{\frac{1}{C_2 R_2} - \frac{2}{T_1}}{\frac{1}{C_2 R_2} + \frac{2}{T_1}}$$

Accordingly, in the flow 307, the constant data A0T is set in a memory M(T2), and in the flow 308, the constant data A1T is set in a memory M(T3), and in the flow 309, the constant data B1T is set in a memory M(T4), and further in the flow 310, an internal memory M(T5) for memorizing the intermediate result of calculation is reset to 0.

Further, in flows 311–315, in order to realize phase advance compensation necessary for the feedback control of the variable vertical angle prism 41, in the flow 311, the feedback loop gain GS of the whole including the gain of phase advance compensation is first set in an internal memory M(S1).

Next, a coefficient for effecting actual phase advance compensation calculation is set in each internal memory by the flows 312–314, and here, analogously expressing a phase advance compensation circuit, it is expressed by a circuit as shown in FIG. 9C, and expressing the frequency characteristic H(S) thereof as the coefficient of H(Z) on Z-plane by the use of known S-Z conversion, with the sampling time interval as $T_2$, it is:

$$AOS = \frac{\frac{1}{C_3 R_3} + \frac{2}{T_2}}{\frac{R_3 + R_4}{C_3 R_3 R_4} + \frac{2}{T_2}}$$

$$A1S = \frac{\frac{1}{C_3 R_3} - \frac{2}{T_2}}{\frac{R_3 + R_4}{C_3 R_3 R_4} + \frac{2}{T_2}}$$

$$A2S = \frac{\frac{R_3 + R_4}{C_3 R_3 R_4} - \frac{2}{T_2}}{\frac{R_3 + R_4}{C_3 R_3 R_4} + \frac{2}{T_2}}$$

Accordingly, in the flow 312, the constant data AOS is set in a memory M(S2), and in the flow 313, the constant data A1S is set in a memory M(S3), and in the flow 314, the constant data B1S is set in a memory M(S4), and further in the flow 315, an internal memory M(S5) for memorizing the intermediate result of calculation is reset to 0.

Subsequently, in flows 316–323, an interruption timer for setting the sampling time interval is started. First, in the flow 316, the sampling time $T_1$ is set in an internal A register, and subsequently, in order to transmit this set value to an interruption timer 1 designated by 105, INST1 output is rendered into an H level in the flow 317. Further, in the flow 318, the value of the A register is transmitted to the interruption timer 1 through INDATA1, and in the flow 319, the INST1 output is rendered into an L level and the interruption timer 1 is started.

Likewise, in the flow 320, the sampling time $T_2$ ($T_2<T_1$) is set in the internal A register and subsequently, in order to transmit this set value to an interruption timer 2 designated by 106, INST2 output is rendered into an H level in the flow 321. Further, in the flow 322, the value of the A register is transmitted to the interruption timer 2 through INDATA2, and in the flow 323, the INST2 output is rendered into an L level and the interruption timer 2 is started.

In this manner, the interruption timers generating interruption at each predetermined time are started, and then the interruption process is carried out while the main operation is executed.

Subsequently, in a flow 324, a memory M(M1) for memorizing the state of the IS switch 120 shown in FIG. 8 is reset to 0, and in a flow 325, a memory M(M2) for controlling the operation of the present embodiment by the state of FADE switch 121 is reset to 0.

Figure 11:
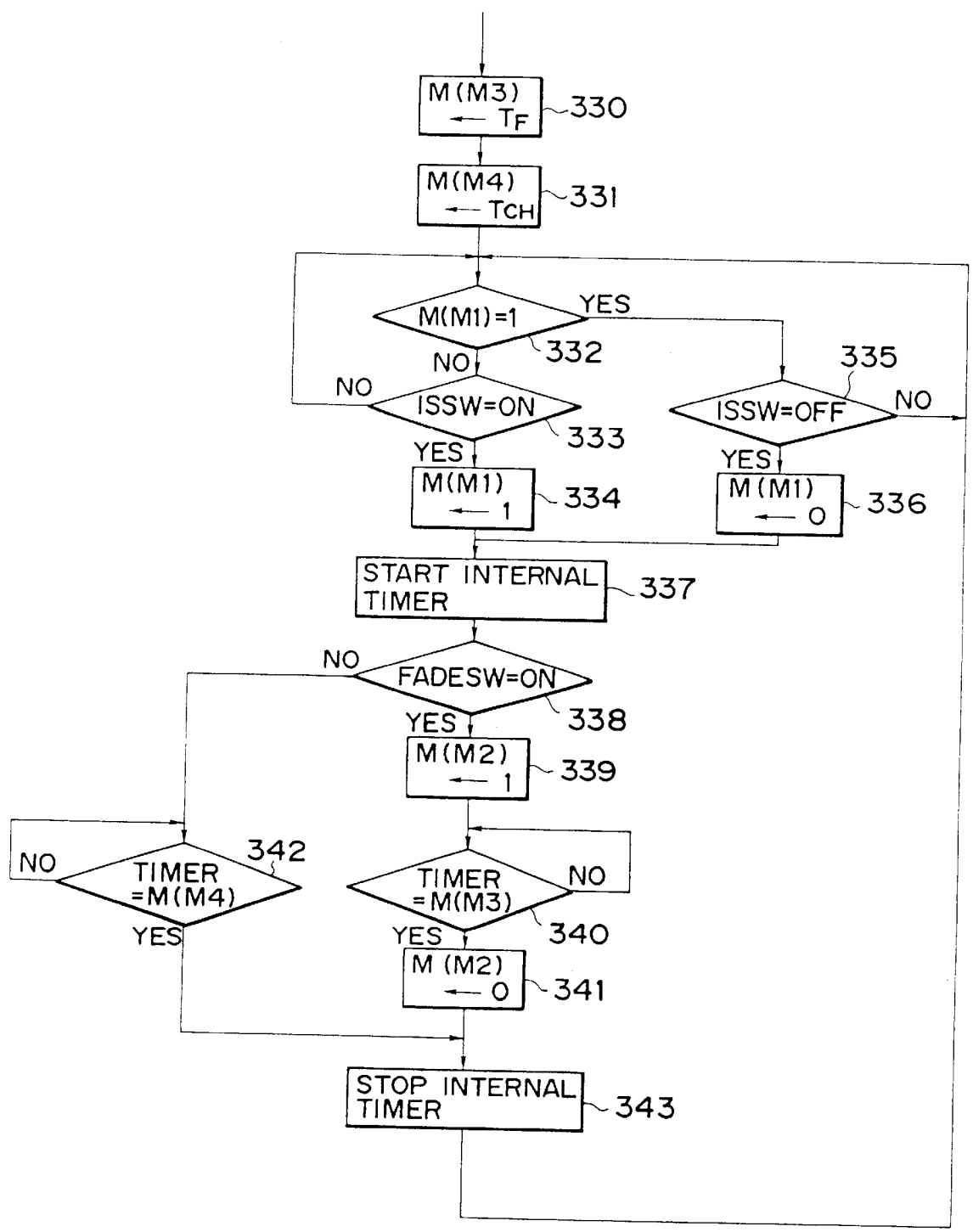

FIG. 11 shows the main operation of the CPU 100. First, in a flow 330, set time data $T_F$ for judging the value of an internal timer 401 is set in an internal memory M(M3), and in a flow 331, set time data $T_{CH}$ is like wise set in an internal memory M(M4).

Next, in a flow 332, the state of an internal memory M(M1) is judged, and if the value of this memory is reset to 0, the state of the IS switch 120 is judged in a flow 333. If here, the IS switch 120 is OFF, return is only made to the flow 332, but if the IS switch 120 is ON, it is judged that the state of this switch has changed from OFF to ON, and in a flow 334, the value of the internal memory M(M1) is set to 1, and then advance is made to a flow 337. On the other hand, if in the flow 332, the internal memory M(M1) is already set to 1, the state of the IS switch 120 is judged in a flow 335. If here, the IS switch 120 is ON, return is made to the flow 332, but if the IS switch 120 is OFF, it is judged that the state of this switch has changes from ON to OFF, and in a flow 336, the value of the internal memory M(M1) is reset to 0 and advance is made to a flow 337. In the flow 337, the internal timer 101 in the CPU 100 shown in FIG. 8 is started from 0, and then in a flow 338, the state of FADE switch 121 is judged. If the FADE switch 121 is OFF, control for gradually changing over the starting/stoppage of the image stabilizing operation as described in t he present embodiment is not exe cuted and therefore, in a flow 342, the value of the internal timer 101 is compared with the value of a memory M(M4) in which the data value $T_{CH}$ is substituted for in advance, and at a time at which the two values coincide with each other, advance is made to a flow 344, where the internal timer is stopped and return is made to the flow 332.

If in the flow 338, the FADE switch 121 is ON, the value of the internal memory M(M2) is set in a flow 339, and subsequently in a flow 340, the value of the internal timer 101 is compared with the effected in the interruption process of the interruption timer 2 which will be described later until the value of the internal timer 101 coincides with the value of the internal memory M(M3). When the value of the internal timer 101 becomes equal to the value of the memory M(M3), advance is made to a flow 341, where the value of the memory M(M2) is reset to 0, and in a flow 343, the internal timer is stopped, and then return is made to the flow 332.

Figure 12:
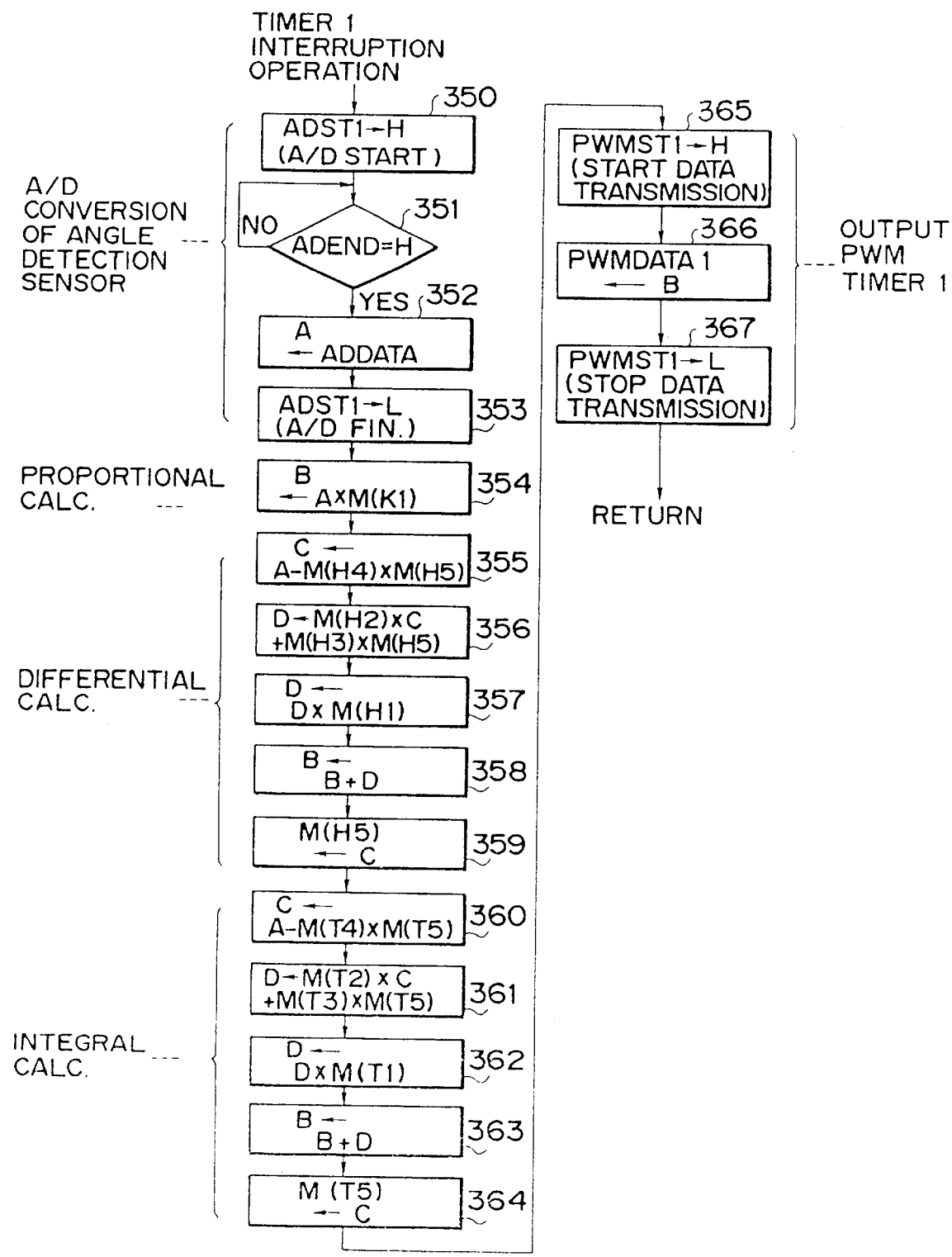

FIG. 12 shows the flowchart of the interruption process by the interruption timer 1. First, in a flow 350, ADST1 output is rendered into an H level, thereby starting the operation of the A/D converter 102. The A/D converter 102 A/D-converts the output of the operational amplifier 16, and renders ADEND output into an H level at a point of time whereat the A/D conversion is terminated. The CPU 100, when it detects in a flow 351 that the ADEND output of the A/D converter 102 has assumed as H level, immediately introduces that digital converted value into A register through ADDATA in a flow 352, and renders ADST1 output into an L level in a flow 353, thus terminating the A/D converting operation.

Next, flows 354–364 are a calculating portion for actually executing the P1D control of the angle deviation detecting means. First, in the flow 354, the value of A register in which the deviation output of the angle deviation detecting means is set is multiplied by the value of a memory M(K1) in which the gain of a proportional term is set, and the result thereof is set in B register and proportional calculation is executed.

Subsequently, in the flow 355, the value of a memory M(H4) in which the aforementioned differential calculation coefficient B1H is set, multiplied by the value of a memory M(H5) memorizing therein the intermediate result of the differential calculation effected in the last interruption process operation, is subtracted from the value of A register in which the deviation output of the angle deviation detecting means, and the result of the subtraction is set in C register.

In the flow 356, the value of the memory M(H5) multiplied by the value of a memory M(H3) in which the aforementioned calculation coefficient A1H is set is added to the value of C register multiplied by the value of a memory M(H2) in which the aforementioned differential calculation coefficient A0H is set, and the result of the addition is set in D register. Further, in the flow 357, the value of this D register is multiplied by the value of a memory M(H1) in which the gain of differential term is set, and the result of the multiplication is again set in D register, and in the flow 358, the value of this D register is added to the value of B register in which the result of proportional calculation is set, and the result of the addition is again set in B register. In the flow 359, the value of C register memorizing therein the intermediate result of the differential calculation effected in the current interruption process operation is set in a memory M(H5) so as to be used in the next interruption process operation.

Likewise in the integral calculation of flows 360–364, first in the flow 360, the value of a memory M(T4) in which the aforementioned integral calculation coefficient B1T is set, multiplied by the value of a memroy M(T5) memorizing therein the intermediate result of the integral calculation effected in the last interruption process operation, is subtracted from the value of A register in which the deviation output of the angle deviation detecting means is set, and the result of the subtraction is set in C register. In the flow 361, the value of the memory M(T5) multiplied by the value of a memory M(T3) in which the aforementioned integral calculation coefficient A1T is set is added to the value of C register multiplied by the value of a memory M(T2) in which the aforementioned differential calculation coefficient A0T is set, and the result of the addtion is set in D register.

Further, in the flow 362, the value of D register is multiplied by the value of a memory M(T1) in which the gain of integral term is set, and the result of the multiplication is again set in D register, and in the flow 363, the value of this D register is added to the value of B register in which the addition of the proportional calculation to the differential calculation is already set, and the result of this addition is again set in B register. In the flow 364, the value of C register memorizing therein the intermediate result of the integral calculation effected in the current interruption process operation is set in a memory M(T5) so as to be used in the next interruption process operation.

Subsequently, in order that the result obtained by P1D-calculating the output of the angle deviation detecting means may be transmitted to PWM timer 1 designated by 103, in a flow 365, PWMST1 output is rendered into an H level, and in a flow 366, the value of B register is transmitted to the PWM timer 1 through PWMDATA 1, whereafter in a flow 367, the PWMST1 output is rendered into an L level, thus terminating the interruption process by this interruption timer 1.

Here, the output of this PWM timer 1 designated by 103 corresponds to data whose duty cycle values of H and L levels have been input at a clock of a predetermined period and thus, the output of a low-pass filter comprised of a resistor 35 and a capacitor 36 is an analog output proportional to these duty cycle values. A power amplifying circuit of the push-pull type is constituted by an operational amplifier 32 and transistors 33 and 34, and the output of the low-pass filter is connected to the non-inverting input terminal of the operational amplifier 32 and thus, an electric current corresponding to the result calculated by the CPU 100 is supplied to the coil 7, and the feedback loop as shown in FIG. 7 is formed.

Figure 13B:
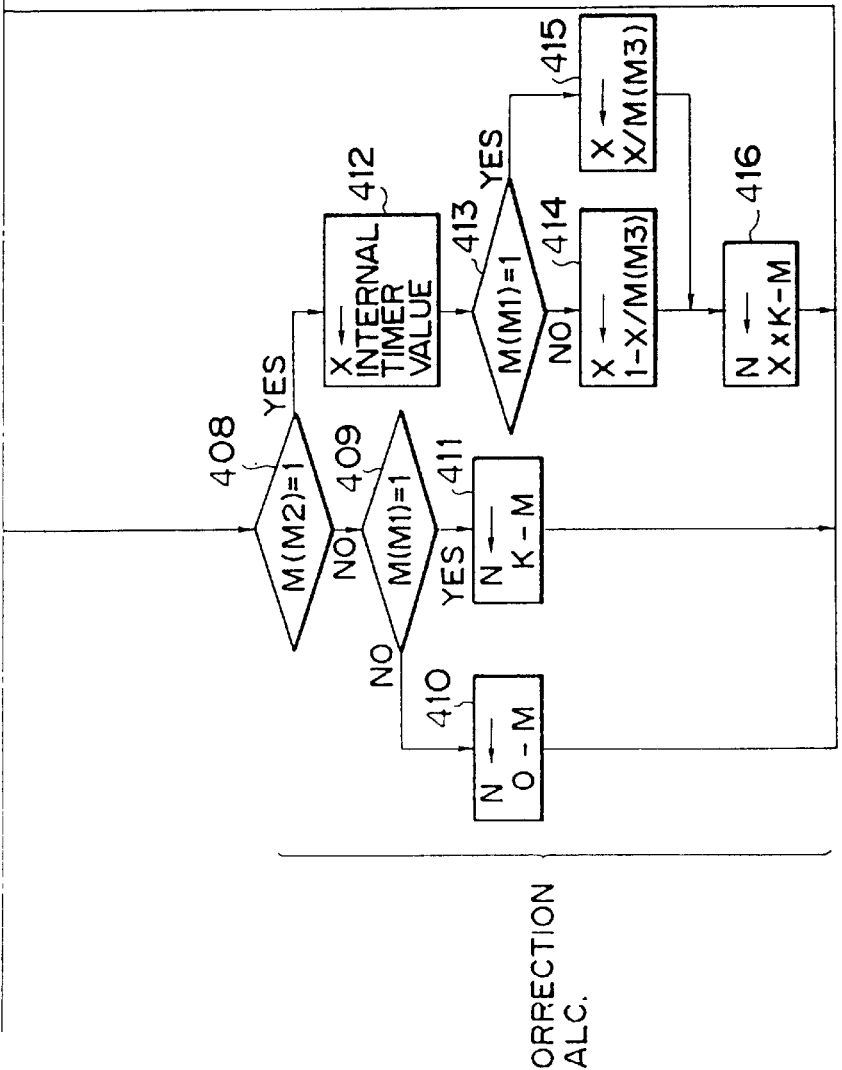

FIG. 13 shows the flow chart of the interruption operation by the interruption timer 2. First, in a flow 400, ADST1 output is rendered into an H level, whereby the operation of the A/D converter 102 is started. The A/D converter 102 A/D-converts the output value of the angle deviation detecting means from the output of the operational amplifier 16, and renders the ADEND output into an H level at a point of time at which the conversion is terminated.

The CPU 100, when in a flow 401, it detects that the ADEND output of the A/D converter 102 has assumed an H level, immediately introduces, in a flow 402, the digital converted value into A register through ADDATA, and in a flow 403, renders ADST1 output into an L level, thus terminating the A/D converting operation.

Subsequently, in a flow 404, ADST2 output is rendered into an H level, whereby the operation of the A/D converter 102 is started. The A/D converter 102 A/D-converts the deviation output value of the variable vertical angle prism 41 from the output of the operational amplifier 56, and renders the ADEND output into an H level at a point of time at which the conversion is terminated. The CPU 100, when in a flow 405, it detects that the ADEND output of the A/D converter 102 has assumed an H level, immediately introduces, in a flow 406, the digital converted value into an M register through ADDATA, and in a flow 407, renders the ADST2 output into an L level, thus terminating the A/D converting operation.

Next, in a flow 408, the value of the memory M(M2) is judged, and if it is reset to 0, it is judged that the control of a variation in the gain with time in the present embodiment is terminated or non-selected, and advance is made to a flow 409. If here, the value of the internal memory M(M1) is reset to 0, the output data of the angle deviation detecting means is fixed at 0 to stop the image stabilizing operation, and the value of the M register in which the deviation data of the variable vertical angle prism 41 is set is subtracted from this value, and the result of the subtraction is set in N register. Also, if the value of the memory M(M1) is set to 1, in a flow 411, the value of M register in which the deviation data of the variable vertical angle prism 41 is set is subtracted from the value of K register in which the output data of the angle deviation detecting means is set, in order to start the image stabilizing operation, and the difference therebetween is set in N register.

On the other hand, if in the flow 408, the value of the memory M(M2) is set to 1, the count value of the internal timer 101 which has already been started in the flow chart of FIG. 11 is first transmitted to X register in a flow 412 to execute the control of a variation in the gain with time relative to the output of the angle deviation detecting means. Subsequently, in a flow 413, the value of the memory M(M1) which indicates whether the image stabilizing operation should be started or stopped is judged, and if this value is reset to 0, in a flow 414, the value of X register is divided by the value of the memory M(M3) in which predetermined data $T_F$ is set, and a value obtained by subtracting the result of the division from 1 is again set in X register. Also, if in the flow 413, the value of the memory M(M1) is set to 1, in a flow 415, the result obtained by dividing the value of X register by the value of the internal memory M(M3) is again set in X register. The interruption operation of the interruption timer 2 is executed at predetermined intervals and thus, the value of the internal timer 101 transmitted to X register in the flow 412 increases by a predetermined number. This control operation is executed until the value of the internal timer 101 coincides with the value of the internal memory M(M3) and therefore, when the flow 414 is passed through, the value of X register decreases at an equal interval from 1 to 0, and when the flow 415 is passed through, said value increases at an equal interval from 0 to 1. In a flow 416, the value of X register as an amplification rate which varies with time is multiplied by the value of K register in which the output data of the angle deviation detecting means is set, and the value of M register in which the deviation data of the variable vertical angle prism 41 is set is subtracted from the result of multiplication, and the value thus obtained is set in N register.

Thus, with 1 being set in the internal memory M(M2), as described above, at the start of the image stabilizing operation, the output of the angle deviation detecting means is gradually applied to the feedback loop of the variable vertical angle prism 41 with time, and at the termination of the image stabilizing operation, the output of the angle deviation detecting means is gradually disconnected from the feedback loop of the variable vertical angle prism 41 with time.

In flows 417–420, in order to achieve the feedback control of the variable vertical angle prism 41, the phase advance compensation as shown in FIG. 9C is digitally calculated in the necessary phase compensation calculating portion. First, in the flow 417, the value of a memory M(S4) in which the aforementioned phase compensation calculation coefficient B1S is set, multiplied by the value of a memory M(S5) memorizing therein the intermediate result of the integration effected in the last interruption process operation, is subtracted from the value of N register in which is set the difference between the deviation output of the angle deviation detecting means multiplied by a certain gain and the deviation output of the variable vertical angle prism 41, and the result of the subtraction is set in S register. In the flow 418, the value of the memory M(S5) multiplied by the value of a memory M(S3) in which the aforementioned phase compensation calculation coefficient A1S is set is added to the value of S register multiplied by the value of a memory M(S2) in which the aforementioned phase compensation calculation coefficient A0S is set, and the result of the addition is set in T register. Further, in the flow 419, the value of this T register is multiplied by the value of a memory M(S1) in which is set the feedback gain including phase compensation, and the result of this multiplication is again set in T register, and in the flow 420, the value of S register memorizing therein the intermediate result of the phase compensation calculated in the current interruption process operation is set in a memory M(S5) so as to be used in the next interruption process operaiton.

Subsequently, in a flow 421, PWMST2 output is rendered into an H level in order to transmit this calculated result to PWM timer 2 designated by 104, and in a flow 422, the value of T register is transmitted to the PWM timer 2 through PWMDATA 2, whereafter in a flow 423, the PWMST2 output is rendered into an L level, thus terminating the interruption operation by the interruption timer 2.

Here, the output of this PWM timer 2 designated by 104 is a clock of a predetermined period, and corresponds to data to which the duty cycle values of H and L levels thereof have been input and therefore, the output of a low-pass filter comprised of a resistor 112 and a capacitor 111 is an analog output proportional to said duty cycle values. A power amplifying circuit of the push-pull type is constituted by an operaitonal amplifier 110 and transistors 113 and 114, and the output of the low-pass filter is connected to the non-inverting input terminal of the operational amplifier 110 and thus, an electric current corresponding to the value of T register which is the calculated result is supplied to the coil 98.

Thus, in the present embodiment, the output of the angle deviation detecting means is multiplied by a coefficient whose value changes between 0 to 1 or between 1 to 0 at equal intervals for a predetermined period in conformity with a variation in the state of the outside switch which expedites the starting/stoppage of the image stabilizing operation, and the result of this multiplication is applied to the feedback loop of the variable vertical angle prism 41 and therefore, at the start of the image stabilizing operation, the output of the angle deviation detecting means is connected to the feedback loop of the variable vertical angle prism 41 gradually and in a predetermined time, and at the termination of the image stabilizing operation, the output of the angle deviation detecting means is disconnected from the feedback loop of the variable vertical angle prism 41 gradually and in a predetermined time, and the occurrence of the discontinuity of the viewfinder image at the start or termination of the image stabilizing operation can be prevented.

Another embodiment of the operation of the FIG. 8 circuit will now be described with reference to the flow charts of FIGS. 14 and 15 which show the operation of the CPU 100.

Figure 14:
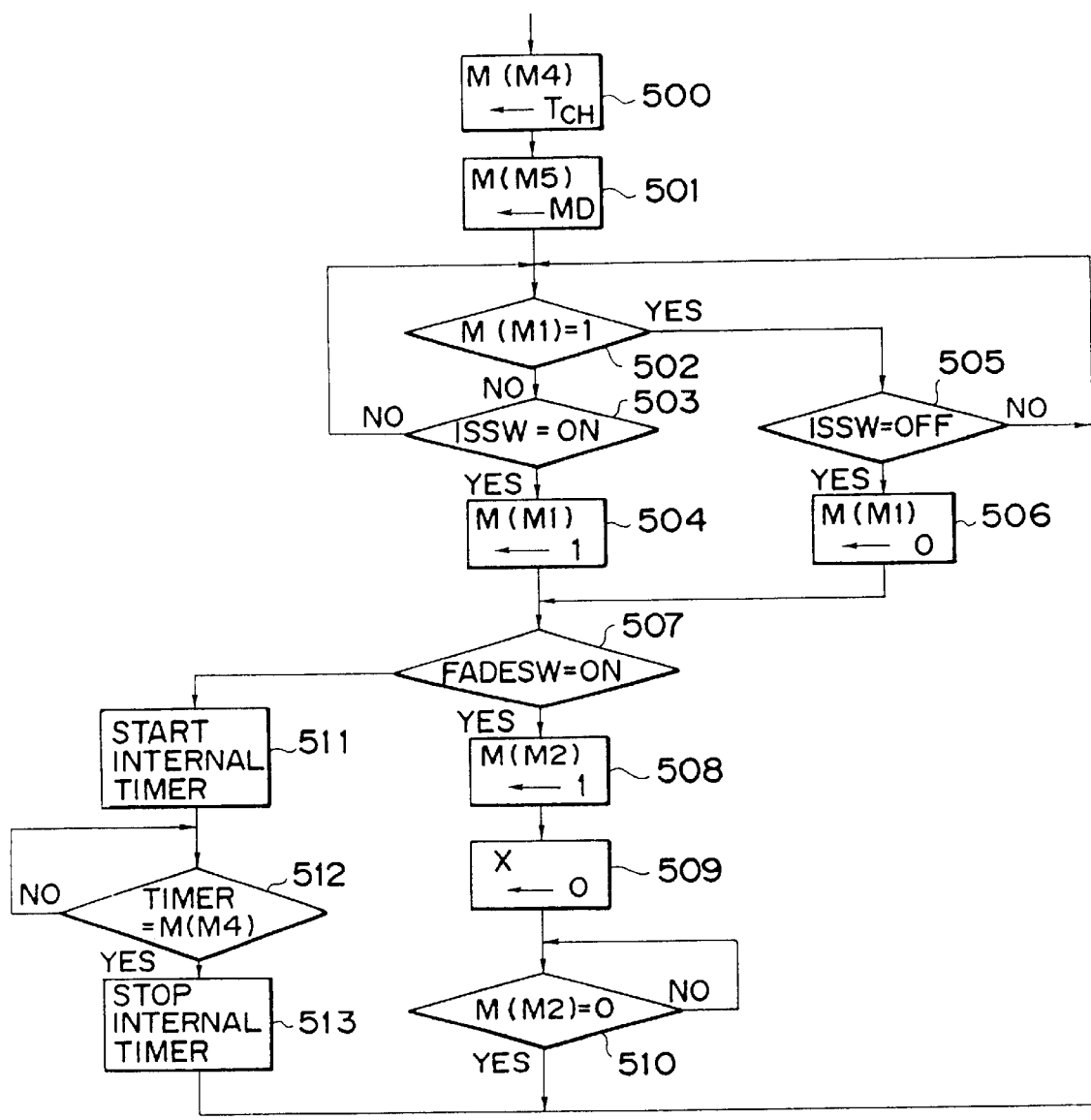
FIGS. 14 to 15B are flow charts showing another embodiment of the operation of the CPU 100 of FIG. 8.

FIG. 14 shows the main operation of the CPU 100. In a flow 500, the set time $T_{CH}$ for judging the value of the internal timer 101 is set in an internal memory M(M4), and in a flow 501, step data MD for gradually executing the starting/stoppage of the image stabilizing operation is se t in the memory M(M5).

Flows 502–506 are similar to the flows 332–336 of FIG. 11, and in these flows, it is detected that the state of the IS switch 120 has changed, and the value of the memory M(M1) is changed over.

In a flow 507, the state of FADE switch 121 is judged, and if this FADE switch 121 is OFF, the control for gradually changing over the starting/stoppage of the image stabilizing operation is not executed as in the embodiment of FIG. 11 and therefore, in a flow 511, the internal timer 101 is started to absorb merely chattering of the switch, and in a flow 512, the program waits until the value of the timer 101 coincides with the value of the memory M(M4). At a point of time at which the value of the timer 101 coincides with the value of the memory M(M4), advance is made to a flow 513, where the internal timer 101 is stopped, and advance is again made to the flow 502.

On the other hand, if in the flow 507, the FADE switch 121 is ON, in a flow 508, the value of the memory M(M2) is set to 1, and subsequently in a flow 509, the value of X register necessary to execute the actual control of the present embodiment is reset to 0. In a flow 510, whether the value of the memory M(M2) has become 0 is judged, and at a point of time at which the control of gradually executing the starting/stoppage of the image stabilizing operation during the change-over of the switch in the interruption operation of the interruption timer 2 which will be described later, the value of the memory M(M2) is reset to 0, and return is made to the flow 502 after the flow 510 has been passed through.

Figure 15:
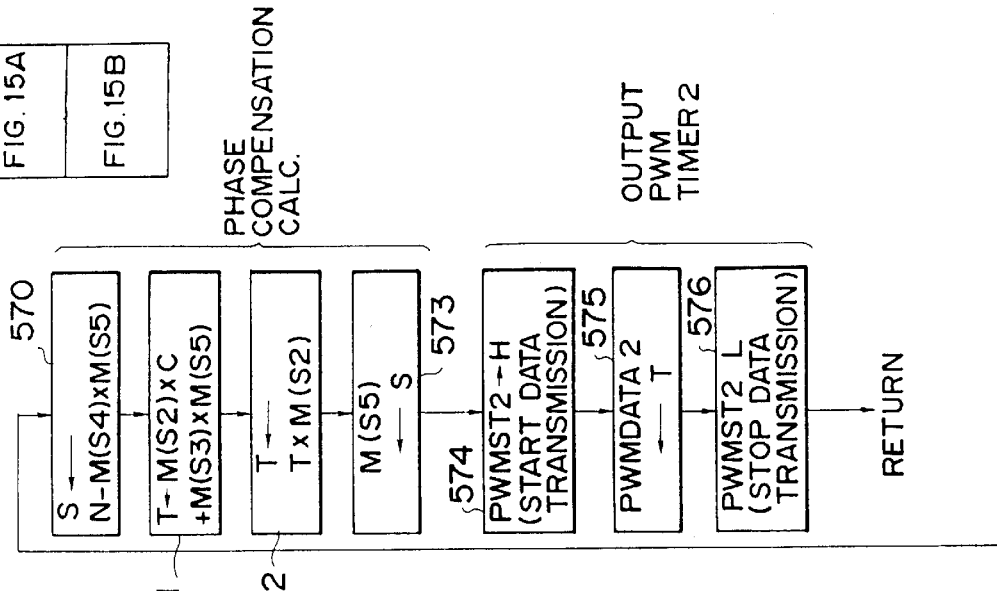
Figure 15A:
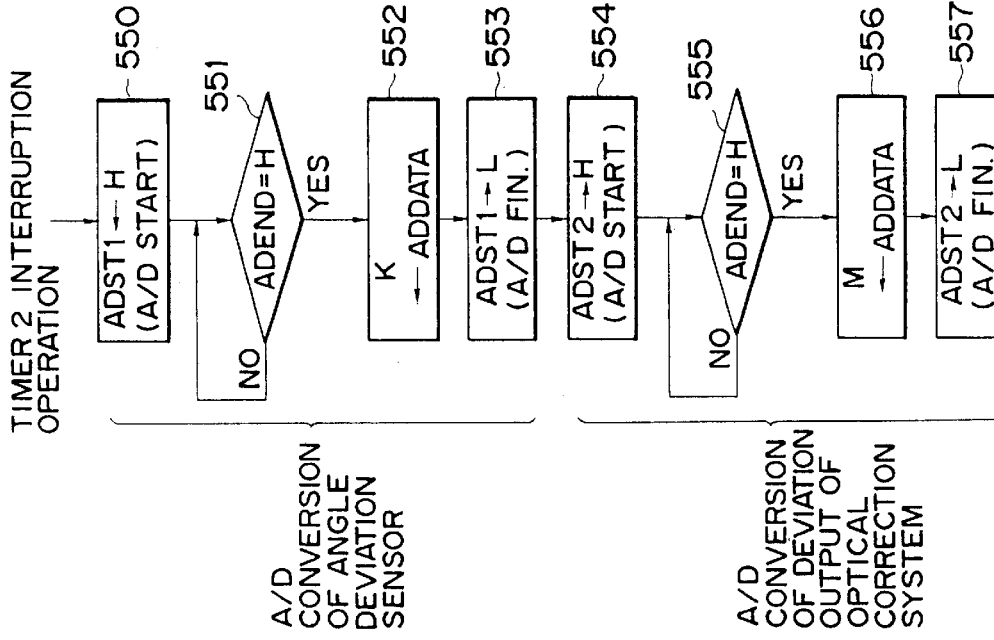
Figure 15B:
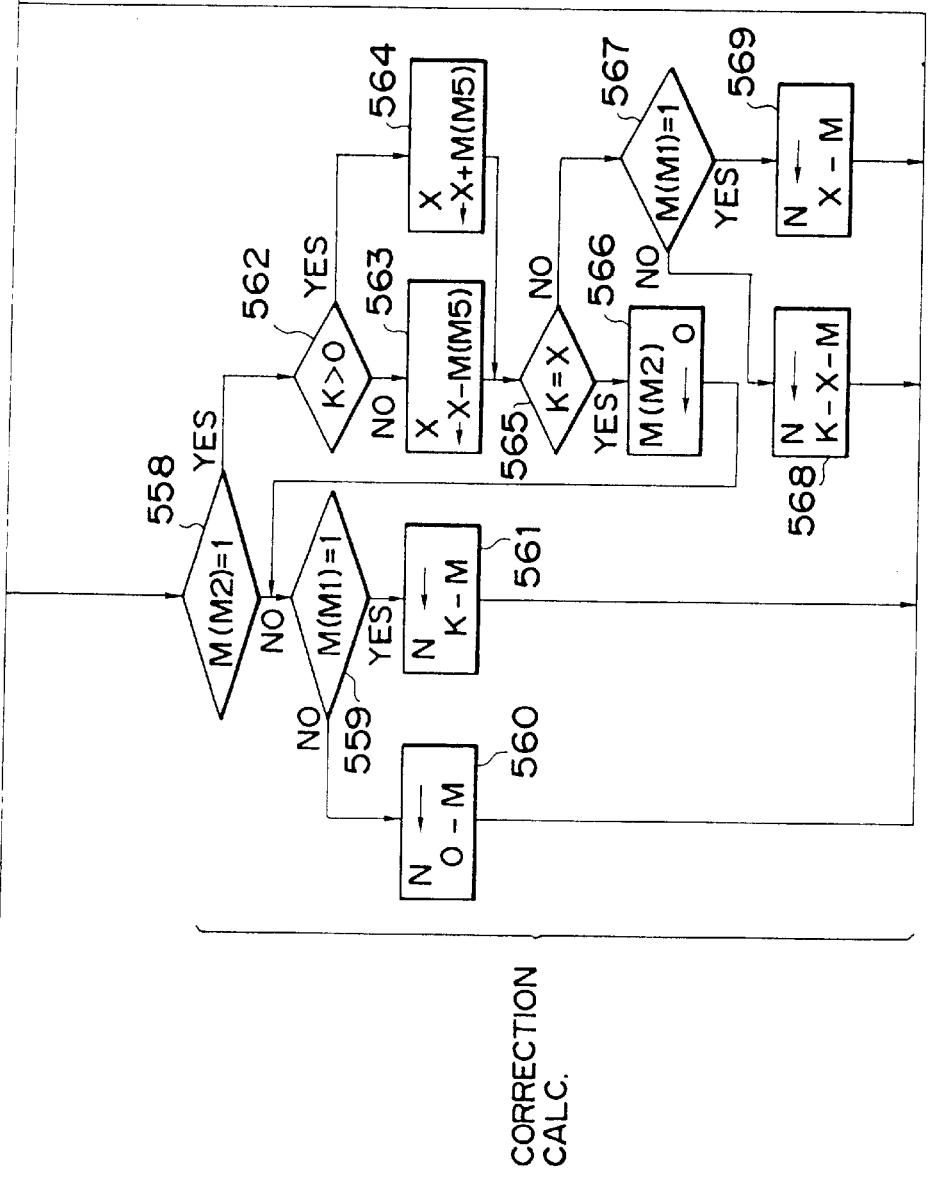

FIG. 15 shows the flow chart of the interruption operation by the interruption timer 2. Flows 550–557 are entirely similar to the flows 400–407 of FIG. 13, and the results of the A/D conversions of the output of the angle deviation detecting means and the deviation output of the variable vertical angle prism 41 are set in K register and M register, respectively.

Subsequently, in a flow 558, the value of the memory M(M2) is judged, and if this value is reset to 0, it is judged that the control of gradually executing the starting/stoppage of the image stabilizing operation in the present embodiment is terminated or non-selected, and as in the flows 409–411 of FIG. 13, flows 559–561 are executed and advance is made to a flow 570.

On the other hand, if in the flow 558, the value of the memory M(M2) is set to 1, the control of a variation in the gain with time is executed relative to the output of the angle deviation detecting means and therefore, if in a flow 562, the value of K register is negative, in a flow 563, the value of the memory M(M5) in which the value of step data MD is preset is subtracted from the value of X register and the result of the subtraction is again set in X register, but if in the flow 562, the value of K register is positive, in a flow 564, the value of the memory M(M5) is added to the value of X register and the result of the addition is again set in X register. In a flow 565, whether the value of X register is equal to the value of K register as the output data of the angle deviation detecting means is judged, and if the former value is equal to the latter value, it is judged that the control of the variation in the gain with time resulting from the change in the state of the switch has been terminated, and after in a flow 566, the memory M(M2) is reset to 0, the operations of the flows 559 and so on are executed. If in the flow 565, the value of K register differs from the value of X register, the value of the memory M(M1) is judged in a flow 567, and if here, the value of the memory M(M1) is reset to 0, in a flow 568, the value of X register is subtracted from the value of K register in which the output data of the angle deviation detecting means is set, in order to gradually stop the image stabilizing operation, and from the result of this subtraction, the value of M register in which the deviation data of the variable vertical angle prism 41 is set is further subtracted, and the result of this subtraction is set in N register.

Also, if the value of the memory M(M1) is set to 1, in a flow 569, the value of M register in which the deviation data of the variable vertical angle prism 41 is set is subtracted from the value of X register, in order to gradually start the image stabilizing operation, and the result of this subtraction is set in N register.

The phase compensation calculation of flows 570–576 and the method of driving the driver circuit through the PWM timer 2 are similar to the flows 417–423 of the FIG. 13 embodiment, and phase compensation calculation for achieving the feedback loop of the variable vertical angle prism 41 is applied to the value set in N register, whereafter the output thereof is put out through the PWM timer 2.

Thus, in the present embodiment, the step data MD set in the memory M(M5) is added or subtracted in conformity with the change in the state of the outside switch which expedites the starting/stoppage of the image stabilizing operation each time the interruption operation of the timer 2 is executed. The variable vertical angle prism 41 is driven on the basis of the cumulative data and therefore, at the start of the image stabilizing operation, the output of the angle deviation detecting means is connected to the feedback loop of the variable vertical angle prism 41 gradually and at a predetermined rate to time, and at the termination of the image stabilizing operation, the output of the angle deviation detecting means is disconnected from the feedback loop of the variable vertical angle prism 41 gradually and at a predetermined rate to time, and the occurrence of the discontinuity of the viewfinder image at the start or termination of the image stabilizing operation.

Still another embodiment of the operation of the circuit of FIG. 8 will now be described with reference to the flow chart of FIGS. 16 and 17 which show the operation of the CPU 100.

Figure 16:
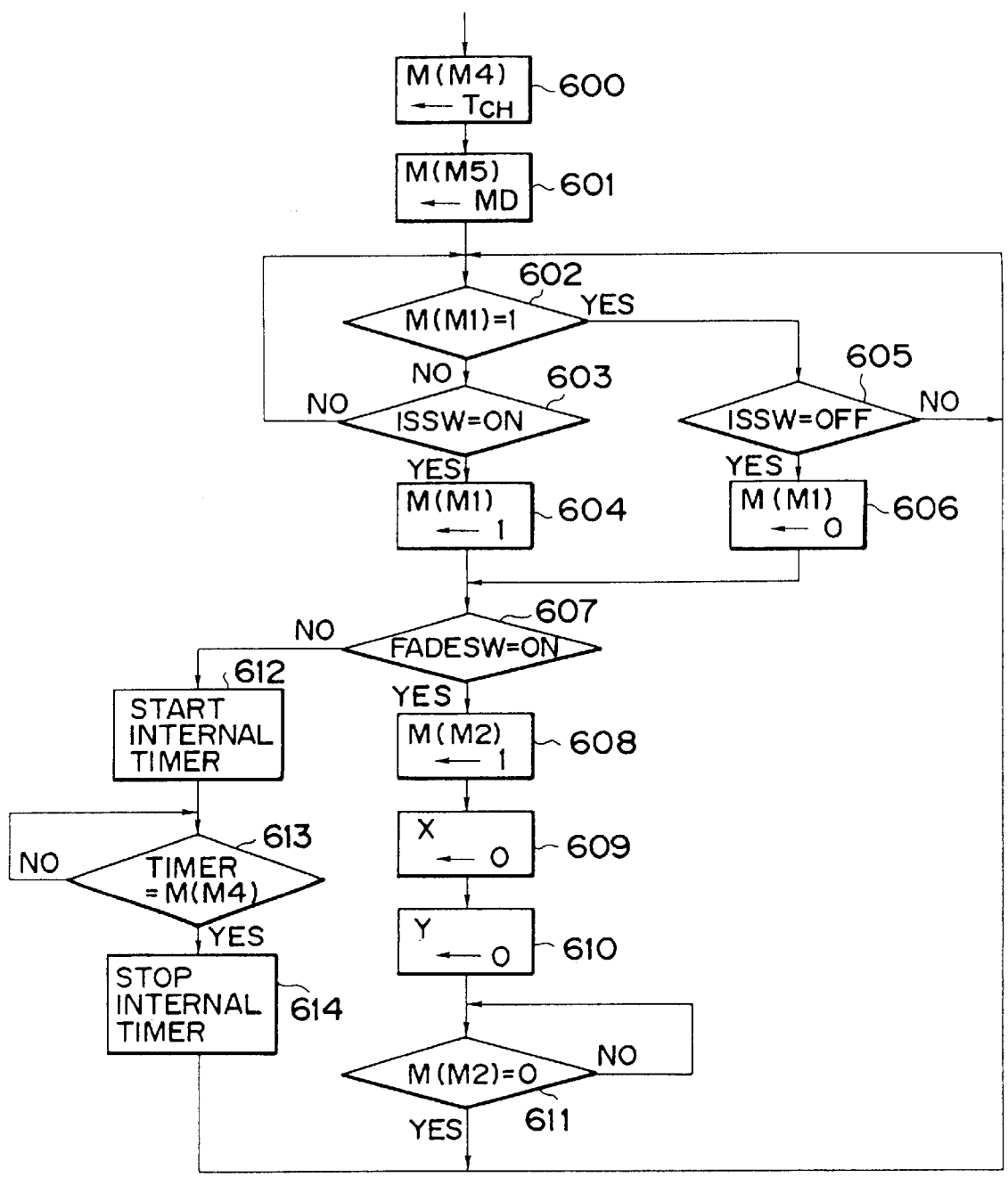

FIG. 16 shows the main operation, and flows 600–606 are similar to the flows 500–506 of FIG. 14.

In a flow 607, the state of FADE switch 121 is judged, and if this switch 121 is OFF, flows 1612–614 are executed as in the flows 511–513 of FIG. 14, and the absorption of the chattering of the switch is executed and return is made to the flow 602.

If in the flow 607, FADE switch 121 is ON, in a flow 608, the value of the memory M(M2) is set to 1, and subsequently in flows 609 and 610, both the value of X register and the value of Y register necessary to execute the actual control of the present embodiment is reset to 0.

In a flow 611, whether the value of the memory M(M2) has become 0 is judged, and at a point of time at which in the interruption operation of the interruption timer 2, the value of the memory M(M2) has been reset to 0, return is made from the flow 611 to the flow 602.

Figure 17B:
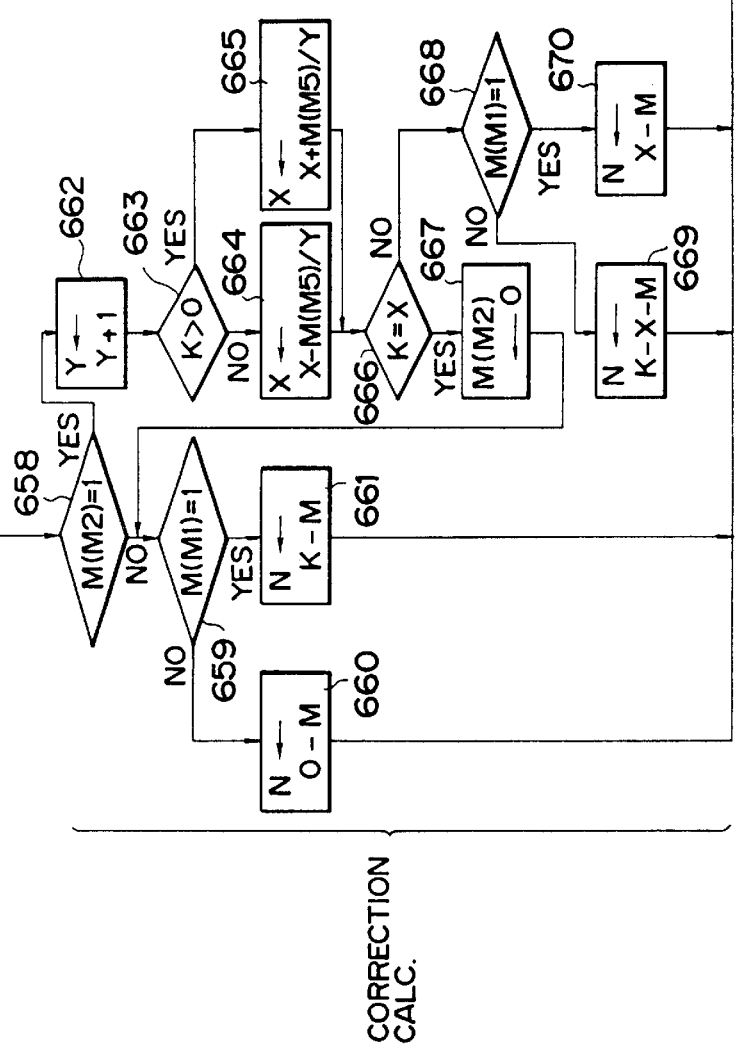
Figure 18:
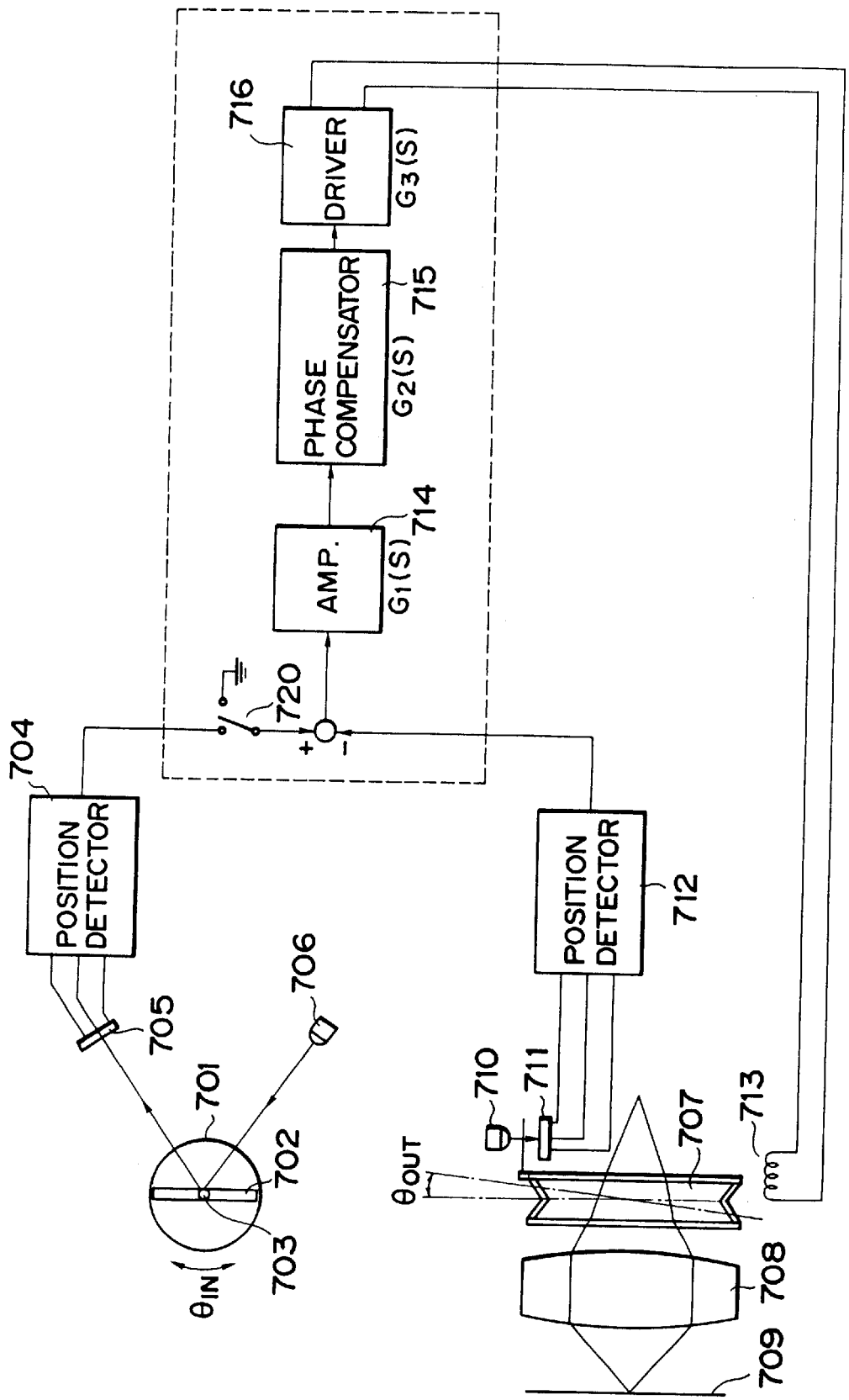
FIG. 18 is a block diagram for illustrating an image stabilizing device according to the prior art.

FIG. 17 shows the flow chart of the interruption operation of the interruption timer 2, and flows 650–661 are similar to the flows 400–411 of the FIG. 13 embodiment and to the flows 550–561 of the FIG. 15 embodiment. The results of the A/D conversions of the output of the angle deviation detecting means and the deviation output of the variable vertical angle prism 41 are set in K register and M register, respectively, and if in the flow 658, the memory M(M2) is reset to 0, it is judged that the control of the starting/stoppage of the image stabilizing operation is terminated or non-selected, and flows 659–661 are executed and thereafter, advance is made to a flow 671.

On the other hand, if in the flow 658, the value of the memory M(M2) is set to 1, in a flow 662, the value of Y register which is reset to 0 in advance in the main process is counted up by 1 in order to execute the control of a variation in the gain with time relative to the output of the angle deviation detecting means. If in a flow 663, the value of K register is negative, in a flow 664, the result obtained by dividing the value of the memory M(M5) in which the value of step data MD is preset by the value of Y register is subtracted from X register, and that value is again set in X register.

Also, if in the flow 663, the value of K register is positive, the result obtained by dividing the value of the memory M(M5) by the value of Y register is added to X register, and that value is again set in X register. In a flow 666, whether the value of X register is equal to the value of K register as the output data of the angle deviation detecting means is judged, and if the former value is equal to the latter value, in a flow 667, the memory M(M2) is reset to 0, and then the operation of the flow 659 is executed. If in the flow 666, the value of K register differs from the value of X register, the value of the memory M(M1) is judged in a flow 668, and if in this flow, the value of the memory M(M1) is reset to 0, in a flow 669, the value of X register and the value of M register are subtracted from the value of K register in order to gradually stop the image stabilizing operation on the basis of the value of X register, and the result of the subtraction is set in N register. Also, if the value of the memory M(M1) is set to 1, in a flow 670, the value of M register is subtracted from the value of X register in order to gradually start the image stabilizing operation, and the result of this subtraction is set in N register.

The phase compensation calculation of flows 671–677 and the driving method of the driver circuit through PWM timer 2 are similar to the flows 417–423 of the FIG. 13 embodiment.

Thus, in the present embodiment, in conformity with a change in the state of the outside switch which expedites the starting/stoppage of the image stabilizing operation, the result obtained by dividing step data MD set in register M(M5) by the value of Y register which increases each time the interruption operation is executed is added or subtracted each time the interruption operation is executed, and on the basis of the cumulative data thereof, the variable vertical angle prism 41 is driven and therefore, at the start of the image stabilizing operation, the output of the angle deviation detecting means is connected to the feedback loop of the variable vertical angle prism 41 gradually and more slowly in the second half than in the first half, and at the termination of the image stabilizing operation, the output of the angle deviation detecting means is disconnected from the feedback loop of the variable vertical angle prism 41 gradually and more slowly in the second half than in the first half, and the occurrence of the discontinuity of the viewfinder image at the start or termination of the image stabilizing operation can be prevented.

The present invention is not restricted to the above-described embodiments, but of course, the present invention can be applied, for example, to devices using any type of image vibration detecting means or any type of image vibration compensating means, and may be directed to any optical instrument.

What is claimed is:

1. An apparatus adapted to be used for an apparatus for performing an image blur prevention operation in accordance with an output of an image blur detecting portion for detecting an image blur, having an amplification portion for amplifying the output of the image blur detecting portion and for substantially outputting an amplified signal to an image blur prevention portion for preventing image blur, the apparatus comprising:

a changing device for forcibly changing a decree of amplification of a signal by a connecting portion against time passage when the image blur prevention portion starts or stops an operation, the connecting portion amplifying the output of the image blur detecting portion for detecting image blur and substantially connecting an amplified signal to the image blur prevention portion for performing image blur prevention, said changing device including means for changing a gain with which the output of the image blur detecting portion for detecting image blur is amplified.

2. An image blur prevention apparatus, having an amplification portion for amplifying an output of an image blur detecting portion and for substantially outputting an amplified signal to an image blur prevention portion for preventing image blur, the apparatus comprising:

a changing device for forcibly changing a degree of amplification of a signal by a connecting portion against time passage when the image blur prevention portion starts or stops an operation, the connecting portion amplifying the output of the image blur detecting portion for detecting image blur and substantially connecting an amplified signal to the image blur prevention portion for performing image blur prevention, said changing device including means for changing a gain with which the output of the image blur detecting portion for detecting image blur is amplified.

3. An optical equipment, having an amplification portion for amplifying an output of an image blur detecting portion and for substantially outputting an amplified signal to an image blur prevention portion for preventing image blur, the optical equipment comprising:

a changing device for forcibly changing a degree of amplification of a signal by a connecting portion against time passage when the image blur prevention portion starts or stops an operation the connecting portion amplifying the output of the image blur detecting portion for detecting image blur and substantially connecting an amplified signal to the image blur prevention portion for performing image blur prevention.

said changing device including means for changing a gain with which the output of the image blur detecting portion for detecting image blur is amplified.

4. An apparatus adapted to be used for an apparatus for performing an image blur prevention operation in accordance with an output of an image blur detecting portion for detecting an image blur, having an amplification portion for amplifying a signal used for image blur prevention and for substantially outputting an amplified signal to an image blur prevention portion for preventing image blur, the apparatus comprising:

a changing device for forcibly changing a degree of amplification of a signal by a connecting portion against time passage when the image blur prevention portion starts or stops an operation, the connecting portion amplifying the output of the image blur detecting portion for detecting image blur and substantially connecting an amplified signal to the image blur prevention portion for performing image blur prevention, said changing device including means for increasing the degree of the amplification with time passage when the image blur prevention portion starts an operation.

5. An image blur prevention apparatus, having an amplification portion for amplifying an output of an image blur detecting portion and for substantially outputting an amplified signal to an image blur prevention portion for preventing image blur, the apparatus comprising:

a changing device for forcibly changing a degree of amplification of a signal by a connecting portion against time passage when the image blur prevention portion starts or stops an operation, the connecting portion amplifying the output of the image blur detecting portion for detecting image blur and substantially connecting an amplified signal to the image blur prevention portion for performing image blur prevention, said changing device including means for increasing the degree of the amplification with time passage when the image blur prevention portion starts an operation.

6. An optical equipment, having an amplification portion for amplifying an output of an image blur detecting portion and for substantially outputting an amplified signal to an image blur prevention portion for preventing image blur, the optical equipment comprising:

a changing device for forcibly changing a degree of amplification of a signal by a connecting portion against time passage when the image blur prevention portion starts or stops an operation, the connecting portion amplifying the output of the image blur detecting portion for detecting image blur and substantially connecting an amplified signal to the image blur prevention portion for performing image blur prevention, said changing device including means for increasing the degree of the amplification with time passage when the image blur prevention portion starts an operation.

7. An apparatus adapted to be used for an apparatus for performing an image blur prevention operation in accordance with an output of an image blur detecting portion for detecting an image blur, having an amplification portion for amplifying the output of the image blur detecting portion and for substantially outputting an amplified signal to an image blur prevention portion for preventing image blur, the apparatus comprising:

a changing device for forcibly changing a degree of amplification of a signal by a connecting portion against time passage when the image blur prevention portion starts or stops an operation, the connecting portion amplifying the output of the image blur detecting portion for detecting image blur and substantially connecting an amplified signal to the image blur prevention portion for performing image blur prevention, said changing device including means for decreasing the degree of the amplification with time passage when the image blur prevention portion stops an operation.

8. An image blur prevention apparatus, having an amplification portion for amplifying an output of an image blur detecting portion and for substantially outputting an amplified signal to an image blur prevention portion for preventing image blur, the apparatus comprising:

a changing device for forcibly changing a degree of amplification of a signal by a connecting portion against time passage when the image blur prevention portion starts or stops an operation, the connecting portion amplifying the output of the image blur detecting portion for detecting image blur and substantially connecting an amplified signal to the image blur prevention portion for performing image blur prevention, said changing device including means for decreasing the decree of the amplification with time passage when the image blur prevention portion stops an operation.

9. An optical equipment, having an amplification portion for amplifying an output of an image blur detecting portion and for substantially outputting an amplified signal to an image blur prevention portion for preventing image blur, the optical equipment comprising:

a changing device for forcibly changing a degree of amplification of a signal by a connecting portion against time passage when the image blur prevention portion starts or stops an operation, the connecting portion amplifying the output of the image blur detecting portion for detecting image blur and substantially connecting an amplified signal to the image blur prevention portion for performing image blur prevention, said changing device including means for decreasing the degree of the amplification with time passage when the image blur prevention portion stops an operation.

10. An apparatus adapted to be used for an apparatus for image blur prevention, having an amplification portion for amplifying signals including at least a fluctuation signal corresponding to a fluctuation, and for substantially outputting the amplified signal to an image blur prevention portion for preventing image blur, the apparatus comprising:

digital fluctuation signal forming means for forming a digital signal including at least a component of the fluctuation signal;

a calculation means for setting a setting value which determines a degree of an amplification of said amplification portion, said calculation means setting said setting value by performing a digital calculation to amplify the digital signal obtained by said digital fluctuation signal forming means, said calculation means varying the setting value more than twice in compliance with a lapsed time when said image blur prevention portion is activated or terminated with said setting value having at least first, second and third different levels, and said calculation means varying the setting value from said first level to said second level in a first setting operation and from said second level to said third level in a second setting operation;

and a further device providing said setting value set by said calculation means to said apparatus for image blur prevention.

11. An apparatus according to claim 10, wherein said calculation means includes means for increasing the degree of the amplification with time passage when the image blur prevention portion starts an operation.

12. An apparatus according to claim 10, wherein said calculation means includes means for decreasing the degree of the amplification with time passage when the image blur prevention portion stops an operation.

13. An apparatus according to claim 10, wherein said amplification portion includes means for amplifying an output of an image blur detection portion for detecting image blur as the signal used for image blur prevention, and the image blur prevention portion includes image blur detection means.

14. An apparatus according to claim 10, wherein said apparatus is provided with a camera.

15. An apparatus according to claim 10, wherein said apparatus is provided with an optical equipment.

16. An apparatus according to claim 10, wherein the amplification portion includes means for amplifying an output of an image blur detection portion for detecting image blur as the signal used for image blur prevention, and the image blur prevention portion includes means for detecting a vibration of said apparatus.

17. An apparatus according to claim 10, wherein the image blur prevention portion includes means for deflecting a light beam.

18. An apparatus according to claim 10, wherein said digital fluctuation signal forming means includes means for forming a signal corresponding to a fluctuation displacement.

19. An apparatus according to claim 10, wherein said digital fluctuation signal forming means includes an A/D converter.

20. An image blur prevention apparatus, comprising:

an amplification portion for amplifying signals including at least a fluctuation displacement signal corresponding to a fluctuation and for substantially outputting the amplified signal to an image blur prevention portion for preventing image blur;

digital fluctuation signal forming means for forming a digital signal including at least a component of the fluctuation signal;

a calculation means for setting a setting value which determines a degree of an amplification of said amplification portion, said calculation means setting said setting valve by performing a digital calculation to amplify the digital signal obtained by said digital fluctuation forming means, said calculation means varying the setting value more than twice in compliance with a lapsed time when said image blur prevention portion is activated or terminated with said setting value having at least first, second and third different levels, and said setting device varying the setting value from said first level to said second level in a first setting operation and from said second level to said third level in a second setting operation.

21. An apparatus according to claim 20, wherein said digital fluctuation signal forming means includes means for forming a signal corresponding to a fluctuation displacement.

22. An apparatus according to claim 20, wherein said digital fluctuation signal forming means includes an A/D converter.

23. An optical equipment, comprising:

an amplification portion for amplifying signals including at least a fluctuation displacement signal corresponding to a fluctuation and for substantially outputting the amplified signal to an image blur prevention portion for preventing image blur;

digital fluctuation signal forming means for forming a digital signal including at least a component of the fluctuation signal;

a calculation means for setting a setting value which determines a degree of an amplification of said amplification portion, said calculation means setting said setting valve by performing a digital calculation to amplify the digital signal obtained by said digital fluctuation forming means, said calculation means varying the setting value more than twice in compliance with a lapsed time when said image blur prevention portion is activated or terminated with said setting value having at least first, second and third different levels, and said setting device varying the setting value from said first level to said second level in a first setting operation and from said second level to said third level in a second setting operation.

24. An equipment according to claim 23, wherein said digital fluctuation signal forming means includes means for forming a signal corresponding to a fluctuation displacement.

25. An equipment according to claim 23, wherein said digital fluctuation signal forming means includes an A/D converter.

26. An apparatus according to claim 10, wherein the amplification portion includes means for amplifying an output of an image blur detection portion for detecting image blur as the signal used for image blur prevention.

27. An image blur prevention apparatus for performing an image blur prevention operation on the basis of a blur displacement signal output by image blur detection means, said apparatus comprising:

start signal generation means for generating a signal which starts said image blur prevention operation; and signal control means for controlling said displacement signal to be gradually enlarged in accordance with an elapsed time on the basis of the signal of said start signal generation means, said image blur prevention operation being performed on the basis of a signal output from said signal control means.

28. An image blur prevention apparatus for performing an image blur prevention operation on the basis of a blur displacement signal output by image blur detection means, said apparatus comprising:

stop signal generation means for generating a signal which stops said image blur prevention operation; and signal control means for controlling said displacement signal to be gradually lessened in accordance with an elapsed time on the basis of the signal of said stop signal generation means, said image blur prevention operation being performed on the basis of a signal output from said signal control means.

\* \* \* \* \*

UNITED STATES PATENT AND TRADEMARK OFFICE
CERTIFICATE OF CORRECTION

PATENT NO. : 6,282,376 B1
DATED : August 28, 2001
INVENTOR(S) : Yasuhiko Shiomi

It is certified that error appears in the above-identified patent and that said Letters Patent is hereby corrected as shown below:

Column 2,
Line 3, delete "Gout" and insert -- $\theta_{out}$ --.

Column 8,
Line 42, delete "time whereat" and insert -- time at which --.

Column 10,
Line 65, delete "resistor 35 and 1S a capacitor 36" and insert -- resistor 35 and a capacitor 36 --.

Column 12,
Line 65, delete "BIS" and insert -- B1S --.

Column 13,
Line 52, delete "t he" and insert -- the --.
Line 63, delete "internal timer 101 is compared with the effected" and insert -- internal time 101 is compared with the value of an internal memory M(M3) in which a data value $T_F$ is substituted for in advance. Accordingly, the actual control of the present embodiment is effected --.

Column 19,
Line 34, delete "1612-614" and insert -- 612-614 --.

Signed and Sealed this

Thirteenth Day of August, 2002

Attest:

JAMES E. ROGAN
Attesting Officer     Director of the United States Patent and Trademark Office